US009002862B2

(12) United States Patent
Schiffmann et al.

(10) Patent No.: US 9,002,862 B2
(45) Date of Patent: Apr. 7, 2015

(54) ENUMERATION OF TREES FROM FINITE NUMBER OF NODES

(71) Applicant: Robert T. and Virginia T. Jenkins as Trustees for the Jenkins Family Trust Dated Feb. 8, 2002, Sacramento, CA (US)

(72) Inventors: Karl Schiffmann, Santa Barbara, CA (US); Mark Andrews, Orinda, CA (US); Jack J. LeTourneau, Santa Barbara, CA (US)

(73) Assignee: Robert T. and Virginia T. Jenkins, Sacramento, CA (US), as Trustees for the Jenkins Family Trust Dated Feb. 8, 2002

( * ) Notice: Subject to any disclaimer, the term of this patent is extended or adjusted under 35 U.S.C. 154(b) by 0 days.

(21) Appl. No.: 14/086,808

(22) Filed: Nov. 21, 2013

(65) Prior Publication Data

US 2014/0289278 A1 Sep. 25, 2014

Related U.S. Application Data

(63) Continuation of application No. 12/627,816, filed on Nov. 30, 2009, now Pat. No. 8,612,461, which is a continuation of application No. 11/006,440, filed on Dec. 6, 2004, now Pat. No. 7,636,727.

(60) Provisional application No. 60/632,203, filed on Nov. 30, 2004.

(51) Int. Cl.
*G06F 17/30* (2006.01)
*G06F 7/00* (2006.01)

(52) U.S. Cl.
CPC .... *G06F 17/30327* (2013.01); *G06F 17/30961* (2013.01); *Y10S 707/99942* (2013.01)

(58) Field of Classification Search
USPC .................................. 707/102, 101, 755, 802
See application file for complete search history.

(56) References Cited

U.S. PATENT DOCUMENTS

| | | | |
|---|---|---|---|
| 3,201,701 | A | 8/1965 | Maitra |
| 4,001,951 | A | 1/1977 | Fasse |
| 4,134,218 | A | 1/1979 | Adams et al. |
| 4,156,910 | A | 5/1979 | Barton et al. |
| 4,439,162 | A | 3/1984 | Blaine |
| 4,677,550 | A | 6/1987 | Ferguson |
| 4,737,109 | A | 4/1988 | Abramson |
| 4,745,561 | A | 5/1988 | Hirosawa et al. |
| 4,751,684 | A | 6/1988 | Holt |
| 4,831,525 | A | 5/1989 | Saito et al. |
| 4,867,686 | A | 9/1989 | Goldstein |
| 4,905,138 | A | 2/1990 | Bourne |
| 4,931,928 | A | 6/1990 | Greenfeld |
| 4,949,388 | A | 8/1990 | Bhaskaran |
| 4,989,132 | A | 1/1991 | Mellender et al. |
| 4,991,087 | A | 2/1991 | Burkowski et al. |
| 5,021,943 | A | 6/1991 | Grimes |

(Continued)

OTHER PUBLICATIONS

U.S. Appl. No. 11/319,758, filed Dec. 27, 2005, Schiffmann.

(Continued)

*Primary Examiner* — Kuen Lu
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed.

24 Claims, 13 Drawing Sheets

(56) References Cited

U.S. PATENT DOCUMENTS 5,021,992 A 6/1991 Kondo
5,191,522 A 3/1993 Bosco et al.
5,235,701 A 8/1993 Ohler et al.
5,265,245 A 11/1993 Nordstrom et al.
5,295,261 A * 3/1994 Simonetti ........................ 707/2
5,335,345 A 8/1994 Frieder et al.
5,355,496 A 10/1994 Fant et al.
5,463,777 A 10/1995 Bialkowski et al.
5,493,504 A 2/1996 Minato
5,497,500 A 3/1996 Rogers et al.
5,509,088 A * 4/1996 Robson ........................ 382/233
5,519,627 A 5/1996 Mahmood et al.
5,522,068 A 5/1996 Berkowitz
5,598,350 A 1/1997 Kawanishi et al.
5,606,669 A 2/1997 Bertin et al.
5,687,362 A 11/1997 Bhargava et al.
5,724,512 A 3/1998 Winterbottom
5,724,576 A 3/1998 LeTourneau
5,758,152 A * 5/1998 LeTourneau .................. 707/102
5,781,906 A 7/1998 Aggarwal et al.
5,787,415 A 7/1998 Jacobson et al.
5,787,432 A 7/1998 LeTourneau
5,796,356 A 8/1998 Okada et al.
5,802,370 A 9/1998 Sitbon et al.
5,822,593 A 10/1998 Lamping et al.
5,848,159 A 12/1998 Collins et al.
5,930,805 A 7/1999 Marquis
5,970,490 A 10/1999 Morgenstern
5,978,790 A 11/1999 Buneman et al.
5,999,926 A 12/1999 Suciu
6,002,879 A 12/1999 Radigan et al.
6,003,033 A 12/1999 Amano et al.
6,022,879 A 2/2000 Crow et al.
6,055,537 A 4/2000 LeTourneau
6,088,691 A 7/2000 Bhargava et al.
6,141,655 A 10/2000 Johnson et al.
6,199,103 B1 3/2001 Sakaguchi et al.
6,236,410 B1 5/2001 Politis et al.
6,243,859 B1 6/2001 Chen-Kuang
6,289,354 B1 9/2001 Aggarwal et al.
6,292,938 B1 9/2001 Sarkar et al.
6,336,812 B1 1/2002 Cooper et al.
6,341,372 B1 1/2002 Datig
6,442,584 B1 8/2002 Kolli et al.
6,446,256 B1 9/2002 Hymen et al.
6,466,240 B1 10/2002 Maslov
6,505,205 B1 1/2003 Kothuri et al.
6,542,899 B1 4/2003 Saulpaugh et al.
6,550,024 B1 4/2003 Pagurek et al.
6,556,983 B1 4/2003 Altschuler et al.
6,598,052 B1 7/2003 Saulpaugh et al.
6,606,632 B1 8/2003 Saulpaugh et al.
6,606,741 B2 8/2003 Kojima et al.
6,609,130 B1 8/2003 Saulpaugh et al.
6,611,844 B1 8/2003 Saulpaugh et al.
6,658,649 B1 12/2003 Bates et al.
6,714,939 B2 * 3/2004 Saldanha et al. .............. 707/102
6,745,384 B1 6/2004 Biggerstaff
6,748,378 B1 6/2004 Lavender et al.
6,763,515 B1 7/2004 Vazquez et al.
6,785,673 B1 8/2004 Fernandez et al.
6,817,865 B2 11/2004 Charbonneau
6,847,979 B2 1/2005 Allemang et al.
6,854,976 B1 2/2005 Suhr
6,874,005 B2 3/2005 Fortenberry et al.
6,965,990 B2 11/2005 Barsness et al.
6,968,330 B2 11/2005 Edwards et al.
7,043,555 B1 5/2006 Mccain et al.
7,051,033 B2 5/2006 Agarwal et al.
7,072,904 B2 * 7/2006 Najork et al. ............. 707/103 R
7,103,838 B1 9/2006 Krishnamurthy et al.
7,127,704 B2 10/2006 Van De Vanter et al.
7,134,075 B2 11/2006 Hind et al.
7,140,006 B2 11/2006 Harrison et al.
7,162,485 B2 1/2007 Gottlob et al.
7,191,182 B2 3/2007 Anonsen et al.
7,203,774 B1 * 4/2007 Zhou et al. ...................... 710/17
7,287,026 B2 10/2007 Oommen
7,313,563 B2 12/2007 Bordawekar et al.
7,318,215 B1 1/2008 Krishnan et al.
7,356,802 B2 4/2008 de Sutter et al.
7,360,202 B1 4/2008 Seshadri et al.
7,409,673 B2 8/2008 Kuo et al.
7,419,376 B2 9/2008 Sarvazyan et al.
7,475,070 B2 1/2009 Fan et al.
7,496,892 B2 2/2009 Nuss
7,512,932 B2 3/2009 Davidov et al.
7,536,675 B2 5/2009 Gallagher
7,544,062 B1 6/2009 Hauschild et al.
7,561,927 B2 7/2009 Oyama et al.
7,571,169 B2 8/2009 Jones et al.
7,574,692 B2 8/2009 Herscu
7,575,434 B2 8/2009 Palakodeti
7,620,632 B2 11/2009 Andrews
7,627,591 B2 12/2009 LeTourneau
7,630,995 B2 12/2009 LeTourneau
7,636,727 B2 12/2009 Schiffmann et al.
7,650,592 B2 1/2010 Eckels et al.
7,669,183 B2 2/2010 Bowman et al.
7,681,177 B2 3/2010 LeTourneau
7,761,847 B2 7/2010 Kornerup et al.
7,761,858 B2 7/2010 Chang et al.
7,779,396 B2 8/2010 Meijer et al.
7,801,923 B2 9/2010 LeTourneau
7,882,147 B2 2/2011 LeTourneau
7,890,928 B2 2/2011 Patrudu
7,899,821 B1 3/2011 Schiffmann
8,032,860 B2 10/2011 Piehler et al.
8,037,102 B2 10/2011 LeTourneau
8,060,868 B2 11/2011 Meijer et al.
8,250,526 B2 8/2012 Anderson et al.
8,316,059 B1 11/2012 Schiffmann et al.
8,356,040 B2 1/2013 LeTourneau
8,443,339 B2 5/2013 LeTourneau
8,626,777 B2 1/2014 LeTourneau
8,650,201 B2 2/2014 Letourneau
8,683,431 B2 3/2014 Thomson et al.
2001/0003211 A1 6/2001 Bera
2002/0040292 A1 4/2002 Marcu
2002/0059281 A1 5/2002 Watanabe et al.
2002/0062259 A1 5/2002 Katz et al.
2002/0129129 A1 9/2002 Bloch et al.
2002/0133497 A1 9/2002 Draper et al.
2002/0149604 A1 10/2002 Wilkinson
2002/0169563 A1 11/2002 de Carvalho Ferreira
2003/0041088 A1 * 2/2003 Wilson et al. ................. 709/104
2003/0065659 A1 4/2003 Agarwal et al.
2003/0115559 A1 6/2003 Sawada
2003/0130977 A1 7/2003 Oommen
2003/0167445 A1 9/2003 Su et al.
2003/0195885 A1 10/2003 Emmick et al.
2003/0195890 A1 10/2003 Oommen
2003/0236794 A1 12/2003 Hostetter et al.
2004/0010752 A1 1/2004 Chan et al.
2004/0024790 A1 2/2004 Everett
2004/0044659 A1 3/2004 Judd et al.
2004/0060007 A1 3/2004 Gottlob et al.
2004/0068498 A1 4/2004 Patchet et al.
2004/0103105 A1 5/2004 Lindblad et al.
2004/0205047 A1 10/2004 Carpenter
2004/0215642 A1 10/2004 Cameron et al.
2004/0239674 A1 12/2004 Ewald et al.
2004/0254909 A1 12/2004 Testa
2004/0260683 A1 12/2004 Chan et al.
2004/0268236 A1 12/2004 Childlovskii et al.
2005/0021548 A1 1/2005 Bohannon et al.
2005/0023524 A1 2/2005 Beatty
2005/0027743 A1 * 2/2005 O'Neil et al. .............. 707/104.1
2005/0050016 A1 3/2005 Stanoi et al.
2005/0050066 A1 3/2005 Hughes
2005/0058976 A1 3/2005 Vernon
2005/0060332 A1 3/2005 Bernstein et al.
2005/0065964 A1 3/2005 Ziemann et al.
2005/0125432 A1 6/2005 Lin et al.

(56) References Cited

U.S. PATENT DOCUMENTS

| | | | |
|---|---|---|---|
| 2005/0138073 | A1 | 6/2005 | Zhou et al. |
| 2005/0154265 | A1 | 7/2005 | Miro et al. |
| 2005/0154979 | A1 | 7/2005 | Chidlovskii et al. |
| 2005/0165732 | A1 | 7/2005 | Burges |
| 2005/0187900 | A1 | 8/2005 | LeTourneau |
| 2005/0214727 | A1 | 9/2005 | Stoianovici et al. |
| 2005/0267908 | A1 | 12/2005 | LeTourneau |
| 2006/0004817 | A1 | 1/2006 | Andrews |
| 2006/0005122 | A1 | 1/2006 | Lemoine |
| 2006/0015538 | A1 | 1/2006 | LeTourneau |
| 2006/0053122 | A1 | 3/2006 | Korn et al. |
| 2006/0074838 | A1 | 4/2006 | Srivastava |
| 2006/0095442 | A1 | 5/2006 | LeTourneau |
| 2006/0095455 | A1 | 5/2006 | LeTourneau |
| 2006/0123029 | A1 | 6/2006 | LeTourneau |
| 2006/0129582 | A1 | 6/2006 | Schiffmann et al. |
| 2006/0209351 | A1 | 9/2006 | Saito |
| 2006/0259533 | A1 | 11/2006 | LeTourneau |
| 2006/0271573 | A1 | 11/2006 | LeTourneau |
| 2007/0003917 | A1 | 1/2007 | Kitching et al. |
| 2007/0198538 | A1 | 8/2007 | Palacios |
| 2010/0094885 | A1 | 4/2010 | Andrews |
| 2010/0094908 | A1 | 4/2010 | LeTourneau |
| 2010/0114969 | A1 | 5/2010 | LeTourneau |

OTHER PUBLICATIONS

U.S. Appl. No. 11/320,538, filed Dec. 27, 2005, LeTourneau.

U.S. Appl. No. 11/412,417, filed Apr. 26, 2006, Schiffmann.

U.S. Appl. No. 11/480,094, filed Apr. 26, 2006, LeTourneau.

U.S. Appl. No. 12/627,816, filed Nov. 30, 2009, Schiffmann.

U.S. Appl. No. 12/702,243, filed Feb. 8, 2010, LeTourneau.

U.S. Appl. No. 12/830,236, filed Jul. 2, 2010, LeTourneau.

"Core Technology Benchmarks A White Paper", Jul. 2002, downloaded from the internet Mar. 2, 2004.

"Origin Data, Inc. White Paper", © 1999, pp. 1-13.

"The Associative Model of Data White Paper", Lazy Software, Ltd., 2000.

ACM Portal Search Results (Kleene and prime and enumeration and operation and natural and numerals and sequences and "enumeration operation") 6 pages.

ACM Portal Search Results (Kleene and prime and enumeration and operation and natural and numerals and sequences and enumeration and operation) 1 page.

Apostol, "A Centennial History of the Prime Number Theorem", Engineering and Science, No. 4, 1996.

Cano et al., "Lazy Evaluation in Penniless Propagation over Join Trees", Networks, vol. 39(4), 2002 Wiley Periodicals, Inc., 175-185, 2002.

Cooper et al., "*Oh! Pascal!*", 1982, W.W. Norton & Company, Inc., Chapter 12, Arrays for Random Access, pp. 295-327.

Er, M.C., "Enumerating Ordered Trees Lexicographically", The Computation Journal, vol. 28, Issue 5, pp. 538-542, 1985.

Google search (Kleene prime enumeration operation natural numerals sequences "Kleene prime") 2 pages.

Google Search (Kleene prime enumeration operation natural numerals sequences "enumeration operation") 2 pages.

Google Search (Kleene prime enumeration operation) 2 pages.

Hoffman et al., "Pattern Matching in Trees", Purdue University, Jan. 1982, Journal for the Association for Computing Machinery, vol. 29, Issue 1, pp. 68-95.

Iacob et al., "XPath Extension for Querying Concurrent XML Markup", Technical Report #TR 394-04, Department of Computer Science, University of Kentucky, Lexington, KY 40506, Mar. 6, 2004, 15 pages.

IEEE Explore Digital Library Search Result 1 page.

Johnston et al. Advances in Dataflow Programming Languages, ACM Computing Surveys, vol. 36, No. 1, pp. 1-34, 2004.

Kharbutli et al., "Using Prime Numbers for Cache Indexing to Eliminate Conflict Misses", Dept. of Electrical and Computer Engineering, North Carolina State University, Feb. 2004, 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

Leinonen et al., "Automation of Document Structure Transformations", Auditorium, Microteknia Building, University of Kuopio, Nov. 5, 2004, 68 pages.

Lerman et al., "Learning the Common Structure of Data", American Association for Artificial Intelligence, AAAI-00 Proceedings, www.aaai.org, Apr. 13, 2000, 6 pages.

Letourneau, "The Elementary Theory of Object Oriented Arithmetic", pp. 1-9, Apr. 1990.

Navarro, "A Guided Tour to Approximate String Matching", ACM Computing Surveys, vol. 33, No. 1, pp. 31-88, 2001.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Reiss, "Semantics-Based Code Search", IEEE ICSE, pp. 243-253, 2009.

Sechrest et al., "Blending Hierarchical and Attribute-Based File Naming", Distributed Computing System, 1992, Proceedings of the 12$^{th}$ International Conference on Jun. 9-12, 1992, pp. 572-580.

Shanmugasundaram et al., "Querying SML Views of Relational Data", Proceedings of the 27$^{th}$ VLDB Conference, Roma, Italy, 2001, 9 pages.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.

Smorynski, Craig, "Logical Number Theory I: An Introduction", Springer-Verlag Berlin Heidelberg, © 1991, Arithmetic Encoding, The Cantor Pairing Function, pp, 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Binary Relations, Ch. 3, Sec. 3.2, Trees, p. 131-145.

Talukdar, "Learning to Create Data-Integrating Queries", ACM PVLDB, pp. 785-796, 2008.

Valiente, "Algorithms on Trees and Graphs", Tree Isomorphism, pp. 151-251, Springer 2002.

Valiente, Gabriel, "Tree Isomorphism," of Algorithms on Trees and Graphs, Chapter 4, published by Springer, 2002, 51 pages.

Wu, "A Prime Number Labeling Scheme for Dynamic Ordered XML Trees", IEEE, 2004, 13 pages.

Zaks, S., "Lexicographic Generation of Ordered Trees", Dept. of Computer Science, University of Illinois, The Journal of Theoretical Computer Science, vol. 10(1), pp. 63-82, Revised 1978.

Dubiner, M., Galil, Z., and Magen, E. "Faster Tree Pattern Matching.", Journal of the Association for Computing Machinery, vol. 41, No. 2, Mar. 1994, pp. 205-213.

Ramesh, R. and Ramakrishnan, I.V., "Nonlinear Pattern Matching in Trees." Journal of the Association for Computer Machinery, vol. 39, No. 2. Apr. 1992, pp. 295-316.

Durango Bill's Enumeration of Trees. http://web.archive.org/web/20021028184112/http://www.durangobill.com/Trees.html, 1998.

Cole, Richard, Hariharan, Ramesh, and Indyk, Piotr. "Tree pattern matching and subset matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.

U.S. Appl. No. 11/005,859, filed Dec. 6, 2004, 120 pages.

U.S. Appl. No. 11/005,859 Notice to File Missing parts mailed Jan. 10, 2005, 2 pages.

U.S. Appl. No. 11/005,859 Response to Notice to File Missing parts mailed Apr. 1, 2005, 9 pages.

U.S. Appl. No. 11/005,859 Preliminary Amendment filed Apr. 28, 2005, 193 pages.

U.S. Appl. No. 11/005,859 Office Action—Restriction Requirement mailed Dec. 12, 2007, 7 pages.

(56) References Cited

OTHER PUBLICATIONS

U.S. Appl. No. 11/005,859 Response to Office Action—Restriction Requirement filed Jan. 14, 2008, 82 pages.
U.S. Appl. No. 11/005,859 Non-final Office Action mailed Mar. 21, 2008, 10 pages.
U.S. Appl. No. 11/005,859 Amendment filed Jul. 21, 2008, 86 pages.
U.S. Appl. No. 11/005,859 Final Office Action mailed Oct. 30, 2008, 14 pages.
U.S. Appl. No. 11/005,859 Amendment filed Dec. 30, 2008, 83 pages.
U.S. Appl. No. 11/005,859 Advisory Action mailed Jan. 13, 2009, 4 pages.
U.S. Appl. No. 11/005,859 RCE with amendment filed Apr. 30, 2009, 86 pages.
U.S. Appl. No. 11/005,859 Final Office Action mailed Jul. 8, 2009, 9 pages.
U.S. Appl. No. 11/005,859 Examiner Interview Summary received Oct. 27, 2009, 3 pages.
U.S. Appl. No. 11/005,859 Amendment filed Dec. 8, 2009, 83 pages.
U.S. Appl. No. 11/005,859 Advisory Action mailed Dec. 22, 2009, 3 pages.
U.S. Appl. No. 11/005,859 RCE with Amendment filed Jan. 7, 2010, 85 pages.
U.S. Appl. No. 11/005,859 Non-Final Office Action mailed Jan. 21, 2010, 8 pages.
U.S. Appl. No. 11/005,859 Response to Non-Office Action filed Feb. 25, 2010, 83 pages.
U.S. Appl. No. 11/005,859 Final Office Action mailed Jun. 8, 2010, 9 pages.
U.S. Appl. No. 11/005,859 Office Action Response mailed Sep. 1, 2010, 89 pages.
U.S. Appl. No. 11/005,859 Advisory Action mailed Sep. 14, 2010, 3 pages.
U.S. Appl. No. 11/005,859 Notice of Appeal mailed Sep. 29, 2010, 1 page.
U.S. Appl. No. 11/005,859 Office Action mailed Oct. 15, 2010, 5 pages.
U.S. Appl. No. 11/005,859 Office Action Response mailed Jan. 18, 2011, 95 pages.
U.S. Appl. No. 11/005,859 Final Office Action mailed Mar. 30, 2011, 7 pages.
U.S. Appl. No. 11/005,859 Notice of Allowance and Fees Due, mailed Jun. 9, 2011, 11 pages.
U.S. Appl. No. 11/005,859 Amendment after Notice of Allowance and Issue Fee Payment, mailed Sep. 9, 2011, 2 pages.
U.S. Appl. No. 11/005,859 Issue Notification, mailed Sep. 21, 2011, 1 page.
U.S. Appl. No. 13/229,624, filed Sep. 9, 2011, 139 pages.
U.S. Appl. No. 13/229,624 Filing receipt, mailed Sep. 21, 2011, 4 pages.
U.S. Appl. No. 13/229,624 Non-Final Office Action, mailed Nov. 23, 2011, 8 pages.
U.S. Appl. No. 13/229,624 Notice of Publication, mailed Dec. 30, 2011, 1 page.
U.S. Appl. No. 13/229,624 Amendment, mailed Feb. 23, 2012, 22 pages.
U.S. Appl. No. 13/229,624 Final Office Action, mailed Mar. 20, 2012, 10 pages.
U.S. Appl. No. 13/229,624 Amendment after final, mailed Jun. 13, 2012, 25 pages.
U.S. Appl. No. 13/229,624 Advisory Action, mailed Jun. 13, 2012, 4 pages.
U.S. Appl. No. 13/229,624 RCE, mailed Jul. 20, 2012, 26 pages.
U.S. Appl. No. 13/229,624 Non-Final Rejection, mailed Oct. 2, 2013, 9 pages.
U.S. Appl. No. 13/229,624 Response to non-final office action, mailed Dec. 27, 2013, 11 pages.
U.S. Appl. No. 13/229,624 Non-Final Office Action, Mailed Apr. 4, 2014, 5 Pages.
U.S. Appl. No. 13/229,624 Non-Final Office Action Response, Mailed Aug. 1, 2014, 9 Pages.
U.S. Appl. No. 11/007,139, filed Dec. 7, 2004, 90 pages.
U.S. Appl. No. 11/007,139 Notice to File Missing Parts mailed Jan. 19, 2005, 2 pages.
U.S. Appl. No. 11/007,139 Response to Notice to File Missing Parts mailed Apr. 1, 2005, 9 pages.
U.S. Appl. No. 11/007,139 Preliminary Amendment filed Apr. 28, 2005, 146 pages.
U.S. Appl. No. 11/007,139 Non-final Office Action mailed May 14, 2007, 58 pages.
U.S. Appl. No. 11/007,139 Amendment filed Oct. 15, 2007, 32 pages.
U.S. Appl. No. 11/007,139 Supplemental Response filed Oct. 17, 2007, 7 pages.
U.S. Appl. No. 11/007,139 Non-final Office Action mailed Jan. 2, 2008 with Examiner's search results, 21 pages.
U.S. Appl. No. 11/007,139 Amendment filed Apr. 2, 2008, 30 pages.
U.S. Appl. No. 11/007,139 Final Office Action mailed Aug. 15, 2008, 30 pages.
U.S. Appl. No. 11/007,139 Amendment filed Oct. 15, 2008, 26 pages.
U.S. Appl. No. 11/007,139 Advisory Action mailed Oct. 22, 2008, 26 pages.
U.S. Appl. No. 11/007,139 RCE with Amendment filed Nov. 14, 2008, 32 pages.
U.S. Appl. No. 11/007,139 Non-final Office Action mailed Dec. 8, 2008, 24 pages.
U.S. Appl. No. 11/007,139 Amendment filed May 8, 2009, 31 pages.
U.S. Appl. No. 11/007,139 Final Office Action mailed Aug. 4, 2009, 26 pages.
U.S. Appl. No. 11/007,139 Amendment filed Dec. 4, 2009, 28 pages.
U.S. Appl. No. 11/007,139 Advisory Action mailed Dec. 14, 2009, 4 pages.
U.S. Appl. No. 11/007,139 RCE with amendment filed Jan. 4, 2010, 27 pages.
U.S. Appl. No. 11/007,139 Non-Final Office Action mailed Jan. 27, 2010, 31 pages.
U.S. Appl. No. 11/007,139 Response to Non-Final Office Action filed Apr. 27, 2010, 30 pages.
U.S. Appl. No. 11/007,139 Office Action mailed Jul. 20, 2010, 20 pages.
U.S. Appl. No. 11/007,139 Office Action response mailed Oct. 20, 2010, 33 pages.
U.S. Appl. No. 11/007,139 Advisory Action mailed Oct. 25, 2010, 2 pages.
U.S. Appl. No. 11/007,139 Office Action response mailed Nov. 18, 2010, 24 pages.
U.S. Appl. No. 11/007,139 Advisory Action mailed Dec. 1, 2010, 4 pages.
U.S. Appl. No. 11/007,139 Office Action response and Notice of Appeal mailed Dec. 20, 2010, 29 pages.
U.S. Appl. No. 11/007,139 Office Action mailed Jan. 3, 2011, 24 pages.
U.S. Appl. No. 11/007,139 Office Action response, mailed May 3, 2011, 27 pages.
U.S. Appl. No. 11/007,139 Final Office Action, mailed Jul. 18, 2011, 23 pages.
U.S. Appl. No. 11/007,139 Amendment after final mailed Oct. 18, 2011, 30 pages.
U.S. Appl. No. 11/007,139 Advisory Action and rule 312 amendment, mailed Nov. 4, 2011, 4 pages.
U.S. Appl. No. 11/007,139 Notice of Appeal filed Nov. 16, 2011, 1 page.
U.S. Appl. No. 11/007,139 Appeal Brief filed May 1, 2012, 93 pages.
U.S. Appl. No. 11/007,139 Notice of defective appeal brief, mailed May 7, 2012, 3 pages.
U.S. Appl. No. 11/007,139 Appeal Brief filed May 15, 2012, 9 pages.
U.S. Appl. No. 11/007,139 Examiner's answer to appeal brief, mailed Aug. 20, 2012, 35 pages.
U.S. Appl. No. 11/007,139 Reply Brief, mailed Oct. 22, 2012, 29 pages.
U.S. Appl. No. 11/007,139 Appeal Docketing Notice, mailed Nov. 6, 2012, 2 pages.
U.S. Appl. No. 11/006,320, filed Dec. 6, 2004, 75 pages.

(56) References Cited

OTHER PUBLICATIONS

U.S. Appl. No. 11/006,320 Response to Missing Parts and Preliminary Amendment filed May 9, 2005, 135 pages.
U.S. Appl. No. 11/006,320 Office Action—Restriction Requirement mailed Mar. 26, 2007, 7 pages.
U.S. Appl. No. 11/006,320 Response to Restriction Requirement filed Apr. 27, 2007, 34 pages.
U.S. Appl. No. 11/006,320 Notice of Non-Compliant Amendment mailed Jul. 6, 2007, 3 pages.
U.S. Appl. No. 11/006,320 Response to Non-Compliant Amendment filed Jul. 25, 2007, 33 pages.
U.S. Appl. No. 11/006,320 Non-final Office Action mailed Oct. 1, 2007, 24 pages.
U.S. Appl. No. 11/006,320 Amendment filed Jan. 29, 2008, 45 pages.
U.S. Appl. No. 11/006,320 Notice of Non-Compliant Amendment mailed Apr. 8, 2008, 4 pages.
U.S. Appl. No. 11/006,320 Amendment filed May 5, 2008, 44 pages.
U.S. Appl. No. 11/006,320 Non-final Office Action mailed Aug. 15, 2008, 33 pages.
U.S. Appl. No. 11/006,320 Amendment filed Nov. 14, 2008, 40 pages.
U.S. Appl. No. 11/006,320 Office Action—Shortened Statutory Period mailed Jan. 27, 2009, 2 pages.
U.S. Appl. No. 11/006,320 Amendment filed Apr. 27, 2009, 44 pages.
U.S. Appl. No. 11/006,320 Final Office Action mailed Jul. 29, 2009, 13 pages.
U.S. Appl. No. 11/006,320 Amendment filed Nov. 30, 2009, 10 pages.
U.S. Appl. No. 11/006,320 Non-final Office Action mailed Dec. 4, 2009, 25 pages.
U.S. Appl. No. 11/006,320 Response to Non-Final Office Action filed Feb. 23, 2010, 11 pages.
U.S. Appl. No. 11/006,320 Final Office Action mailed May 24, 2010, 11 pages.
U.S. Appl. No. 11/006,320 Office Action response mailed Aug. 24, 2010, 15 pages.
U.S. Appl. No. 11/006,320 Notice of Allowance mailed Sep. 17, 2010, 8 pages.
U.S. Appl. No. 11/006,320 Examiner Interview Summary and supplemental Notice of Allowance mailed Dec. 17, 2010, 9 pages.
U.S. Appl. No. 11/006,320 Rule 312 Amendment and Issue Fee payment mailed Dec. 17, 2010, 10 pages.
U.S. Appl. No. 11/006,320 Issue Notification mailed Jan. 12, 2011, 1 page.
U.S. Appl. No. 12/972,326, filed Dec. 17, 2010, 74 pages.
U.S. Appl. No. 12/972,326 Filing receipt and Notice to File Missing Parts mailed Jan. 6, 2011, 5 pages.
U.S. Appl. No. 12/972,326 Response to Notice to File Missing parts mailed Jan. 26, 2011, 14 pages.
U.S. Appl. No. 12/972,326 Filing Receipt, mailed Feb. 18, 2011, 3 pages.
U.S. Appl. No. 12/972,326 Preliminary amendment mailed May 20, 2011, 15 pages.
U.S. Appl. No. 12/972,326 Notice of publication and non-compliant amendment mailed Jun. 2, 2011, 3 pages.
U.S. Appl. No. 12/972,326 Preliminary amendment mailed Jul. 5, 2011, 21 pages.
U.S. Appl. No. 12/972,326 Notice of additional fee due, mailed Jul. 12, 2011, 2 pages.
U.S. Appl. No. 12/972,326 Preliminary Amendment mailed Aug. 10, 2011, 7 pages.
U.S. Appl. No. 12/972,326 Non-Final Office Action, mailed Feb. 23, 2012, 9 pages.
U.S. Appl. No. 12/972,326 Abandonment, mailed Sep. 18, 2012, 2 pages.
U.S. Appl. No. 13/014,677, filed Jan. 26, 2011, 90 pages.
U.S. Appl. No. 13/014,677 Notice to file missing parts and filing receipt, mailed Mar. 23, 2011, 5 pages.
U.S. Appl. No. 13/014,677 Notice of Abandonment mailed Nov. 29, 2011, 2 pages.
U.S. Appl. No. 11/006,848, filed Dec. 7, 2004, 59 pages.
U.S. Appl. No. 11/006,848 Notice to File Missing Parts mailed Mar. 18, 2005, 2 pages.
U.S. Appl. No. 11/006,848 Response to Notice to File Missing Parts mailed May 3, 2005, 101 pages.
U.S. Appl. No. 11/006,848 Non-Final Office Action mailed Apr. 4, 2007, 11 pages.
U.S. Appl. No. 11/006,848 Response to Non-Final Office Action mailed Oct. 3, 2007, 20 pages.
U.S. Appl. No. 11/006,848 Supplemental Amendment mailed Nov. 13, 2007, 4 pages.
U.S. Appl. No. 11/006,848 Non-Final Office Action mailed Feb. 5, 2008, 16 pages.
U.S. Appl. No. 11/006,848 Response to Non-Final Office Action filed Aug. 4, 2008, 27 pages.
U.S. Appl. No. 11/006,848 Final Office Action mailed Dec. 2, 2008, 30 pages.
U.S. Appl. No. 11/006,848 RCE filed May 4, 2009, 24 pages.
U.S. Appl. No. 11/006,848 Notice of Allowance mailed Jun. 11, 2009, 8 pages.
U.S. Appl. No. 11/006,848 Issue fee mailed Sep. 11, 2009, 10 pages.
U.S. Appl. No. 11/006,848 Issue Notification mailed Oct. 28, 2009, 1 page.
U.S. Appl. No. 12/573,829, filed Oct. 5, 2009, 64 pages.
U.S. Appl. No. 12/573,829 Notice to File Missing Parts and Filing Receipt mailed Oct. 20, 2009, 5 pages.
U.S. Appl. No. 12/573,829 Preliminary Amendment mailed Dec. 21, 2009, 17 pages.
U.S. Appl. No. 12/573,829 Filing receipt mailed Jan. 4, 2010, 5 pages.
U.S. Appl. No. 12/573,829 Notice of Publication mailed Apr. 15, 2010, 1 page.
U.S. Appl. No. 12/573,829 Office Action mailed Jun. 28, 2010, 35 pages.
U.S. Appl. No. 12/573,829 Office Action Response mailed Sep. 28, 2010, 22 pages.
U.S. Appl. No. 12/573,829 Office Action mailed Nov. 1, 2010, 29 pages.
U.S. Appl. No. 12/573,829 Office Action Response mailed Jan. 3, 2011, 29 pages.
U.S. Appl. No. 12/573,829 Advisory Action mailed Jan. 7, 2011, 3 pages.
U.S. Appl. No. 12/573,829 Notice of Appeal mailed Jan. 11, 2011, 1 page.
U.S. Appl. No. 12/573,829 Appeal Brief, mailed May 4, 2011, 68 pages.
U.S. Appl. No. 12/573,829 Examiner's Answer to Appeal Brief, mailed Jul. 21, 2011, 31 pages.
U.S. Appl. No. 12/573,829 Reply brief filed Sep. 21, 2011, 17 pages.
U.S. Appl. No. 12/573,829 Reply brief noted Oct. 5, 2011, 2 pages.
U.S. Appl. No. 12/573,829 Appeal Docketing notice Oct. 11, 2011, 2 pages.
U.S. Appl. No. 12/573,829 Appeal Board Decision, mailed May 9, 2014, 10 pages.
U.S. Appl. No. 12/573,829 Request for continued examination, mailed Jul. 9, 2014, 19 pages.
U.S. Appl. No. 11/006,841, filed Dec. 7, 2004, 63 pages.
U.S. Appl. No. 11/006,841 Notice to file missing parts mailed Jan. 10, 2005, 2 pages.
U.S. Appl. No. 11/006,841 Response to Notice to file missing parts and preliminary amendment mailed Apr. 14, 2005, 105 pages.
U.S. Appl. No. 11/006,841 Non-Final OA mailed Apr. 6, 2007, 16 pages.
U.S. Appl. No. 11/006,841 Response to Non-Final OA mailed Sep. 6, 2007, 63 pages.
U.S. Appl. No. 11/006,841 Restriction Requirement mailed Nov. 27, 2007, 5 pages.
U.S. Appl. No. 11/006,841 Restriction Requirement response mailed Dec. 27, 2007, 36 pages.
U.S. Appl. No. 11/006,841 Restriction Requirement mailed Mar. 17, 2008, 9 pages.
U.S. Appl. No. 11/006,841 Response to Restriction Requirement mailed Jul. 17, 2008, 33 pages.

(56) References Cited

OTHER PUBLICATIONS

U.S. Appl. No. 11/006,841 Final Office Action mailed Oct. 29, 2008, 54 pages.
U.S. Appl. No. 11/006,841 Response to Final Office Action mailed Dec. 29, 2008, 45 pages.
U.S. Appl. No. 11/006,841 Advisory Action mailed Jan. 6, 2009, 3 pages.
U.S. Appl. No. 11/006,841 RCE mailed Apr. 23, 2009, 48 pages.
U.S. Appl. No. 11/006,841 Supplemental Response mailed Jun. 26, 2009, 34 pages.
U.S. Appl. No. 11/006,841 Notice of Allowance mailed Jun. 29, 2009, 40 pages.
U.S. Appl. No. 11/006,841 Issue Fee mailed Sep. 29, 2009, 4 pages.
U.S. Appl. No. 11/006,841 Issue Notification mailed Nov. 11, 2009, 1 page.
U.S. Appl. No. 12/578,411 Continuation application filed Oct. 13, 2009, 75 pages.
U.S. Appl. No. 12/578,411 Notice of Missing Parts mailed Oct. 28, 2009, 6 pages.
U.S. Appl. No. 12/578,411 Response to Missing Parts filed Dec. 28, 2009, 25 pages.
U.S. Appl. No. 12/578,411 Filing Receipt mailed Jan. 7, 2010, 3 pages.
U.S. Appl. No. 12/578,411 Notice of Publication mailed Apr. 15, 2010, 1 page.
U.S. Appl. No. 12/578,411 Restriction requirement mailed Jun. 8, 2011, 6 pages.
U.S. Appl. No. 12/578,411 Response to restriction requirement mailed Jul. 6, 2011, 19 pages.
U.S. Appl. No. 12/578,411 Non-Final Office Action, mailed Aug. 23, 2011, 19 pages.
U.S. Appl. No. 12/578,411 Non-Final Office Action response mailed Dec. 22, 2011, 38 pages.
U.S. Appl. No. 12/578,411 Final Rejection mailed Jan. 20, 2012, 16 pages.
U.S. Appl. No. 12/578,411 Amendment, mailed May 21, 2012, 23 pages.
U.S. Appl. No. 12/578,411 Advisory Action, mailed May 31, 2012, 4 pages.
U.S. Appl. No. 12/578,411 RCE, mailed Jun. 12, 2012, 38 pages.
U.S. Appl. No. 12/578,411 Notice of Allowance, mailed Aug. 19, 2013, 19 pages.
U.S. Appl. No. 12/578,411 Issue fee payment and Rule 312 amendment, mailed Nov. 14, 2013, 14 pages.
U.S. Appl. No. 12/578,411 Examiner response to rule 312 amendment, mailed Nov. 19, 2013, 2 pages.
U.S. Appl. No. 12/578,411 Response to Amendment under rule 312, mailed Dec. 3, 2013, 3 pages.
U.S. Appl. No. 12/578,411 Issue Notification, mailed Dec. 18, 2013, 1 page.
U.S. Appl. No. 14/086,837, filed Nov. 21, 2013, 68 Pages.
U.S. Appl. No. 14/086,837 Notice to File Missing Parts, Mailed Dec. 12, 2013, 5 Pages.
U.S. Appl. No. 14/086,837 Applicant Response to Pre-Exam Formalities Notice, Mailed Jun. 11, 2014, 26 Pages.
U.S. Appl. No. 14/086,837 Notice of Publication, Mailed Sep. 25, 2014, 4 Pages.
U.S. Appl. No. 11/006,440, filed Dec. 6, 2004, 85 pages.
U.S. Appl. No. 11/006,440 Notice to file missing parts Jan. 11, 2005, 2 pages.
U.S. Appl. No. 11/006,440 Response to Notice to file missing parts mailed Mar. 15, 2005, 8 pages.
U.S. Appl. No. 11/006,440 Preliminary Amendment mailed Apr. 28, 2005, 140 pages.
U.S. Appl. No. 11/006,440 Preliminary Amendment and Substitute Specification mailed Oct. 10, 2006, 139 pages.
U.S. Appl. No. 11/006,440 Restriction Requirement mailed Mar. 29, 2007, 5 pages.
U.S. Appl. No. 11/006,440 Response to Restriction Requirement mailed Apr. 30, 2007, 42 pages.
U.S. Appl. No. 11/006,440 Non-Final Office Action mailed Jun. 21, 2007, 15 pages.
U.S. Appl. No. 11/006,440 Response to Non-Final Office Action mailed Nov. 20, 2007, 42 pages.
U.S. Appl. No. 11/006,440 Final Office Action mailed Feb. 6, 2008, 13 pages.
U.S. Appl. No. 11/006,440 Response to Final Office Action mailed Apr. 7, 2008, 34 pages.
U.S. Appl. No. 11/006,440 Advisory Action mailed May 9, 2008, 3 pages.
U.S. Appl. No. 11/006,440 Notice of appeal mailed Aug. 4, 2008, 1 page.
U.S. Appl. No. 11/006,440 RCE mailed Nov. 4, 2008, 39 pages.
U.S. Appl. No. 11/006,440 Final Office Action mailed Jan. 23, 2009, 22 pages.
U.S. Appl. No. 11/006,440 Amendment after Final mailed Apr. 23, 2009, 34 pages.
U.S. Appl. No. 11/006,440 Supplemental Amendment mailed Jul. 17, 2009, 29 pages.
U.S. Appl. No. 11/006,440 Notice of Allowance mailed Jul. 31, 2009, 15 pages.
U.S. Appl. No. 11/006,440 Examiner's Amendment and Reasons for Allowance mailed Sep. 3, 2009, 9 pages.
U.S. Appl. No. 11/006,440 Issue Fee mailed Nov. 2, 2009, 12 pages.
U.S. Appl. No. 11/006,440 Issue Notification mailed Dec. 2, 2009, 1 page.
U.S. Appl. No. 12/627,816 Continuation application filed Nov. 30, 2009, 95 pages.
U.S. Appl. No. 12/627,816 Notice of Missing Parts mailed Dec. 15, 2009, 2 pages.
U.S. Appl. No. 12/627,816 Response to Missing Parts filed Apr. 12, 2010, 21 pages.
U.S. Appl. No. 12/627,816 Filing Receipt mailed Apr. 20, 2010, 3 pages.
U.S. Appl. No. 12/627,816 Notice of Publication mailed Jul. 29, 2010, 1 page.
U.S. Appl. No. 12/627,816 Non-Final OA, mailed May 5, 2011, 19 pages.
U.S. Appl. No. 12/627,816 Non-Final OA response, mailed Nov. 7, 2011, 12 pages.
U.S. Appl. No. 12/627,816 Final Rejection mailed Nov. 17, 2011, 18 pages.
U.S. Appl. No. 12/627,816 RCE mailed Feb. 17, 2012, 20 pages.
U.S. Appl. No. 12/627,816 Terminal disclaimer review, mailed Mar. 7, 2012, 1 page.
U.S. Appl. No. 12/627,816 Notice of Allowance, mailed Aug. 1, 2013, 16 pages.
U.S. Appl. No. 12/627,816 Issue fee payment and Rule 312 amendment, mailed Nov. 1, 2013, 14 pages.
U.S. Appl. No. 12/627,816 Examiner response to rule 312 amendment, mailed Nov. 13, 2013, 2 pages.
U.S. Appl. No. 12/627,816 Issue Notification, mailed Nov. 26, 2013, 1 page.
U.S. Appl. No. 11/006,446, filed Dec. 6, 2004, 91 pages.
U.S. Appl. No. 11/006,446 Notice of Missing Parts mailed Jan. 24, 2005, 3 pages.
U.S. Appl. No. 11/006,446 Response to Notice to File Missing Parts mailed Mar. 29, 2005, 8 pages.
U.S. Appl. No. 11/006,446 Preliminary Amendment filed Apr. 28, 2005, 118 pages.
U.S. Appl. No. 11/006,446 Office Action—Restriction Requirement mailed Apr. 4, 2007, 5 pages.
U.S. Appl. No. 11/006,446 Response to Office Action—Restriction Requirement filed May 3, 2007, 6 pages.
U.S. Appl. No. 11/006,446 Non-final Office Action mailed Jul. 26, 2007, 45 pages.
U.S. Appl. No. 11/006,446 Amendment filed Nov. 26, 2007, 38 pages.
U.S. Appl. No. 11/006,446 Non-final Office Action mailed Feb. 20, 2008, 67 pages.
U.S. Appl. No. 11/006,446 Amendment filed Jul. 21, 2008, 33 pages.
U.S. Appl. No. 11/006,446 Final Office Action mailed Oct. 28, 2008, 49 pages.

(56) References Cited

OTHER PUBLICATIONS

U.S. Appl. No. 11/006,446 Amendment filed Dec. 29, 2008, 33 pages.
U.S. Appl. No. 11/006,446 Advisory Action mailed Jan. 7, 2009, 4 pages.
U.S. Appl. No. 11/006,446 RCE with Amendment filed Apr. 28, 2009, 38 pages.
U.S. Appl. No. 11/006,446 Non-final Office Action mailed Jul. 7, 2009, 41 pages.
U.S. Appl. No. 11/006,446 Examiner Interview Summary and Search Results mailed Oct. 26, 2009, 6 pages.
U.S. Appl. No. 11/006,446 Amendment mailed Dec. 7, 2009, 33 pages.
U.S. Appl. No. 11/006,446 Examiner Interview Summary mailed Mar. 19, 2010, 4 pages.
U.S. Appl. No. 11/006,446 Notice of Allowance/Allowability mailed Mar. 19, 2010, 29 pages.
U.S. Appl. No. 11/006,446 Issue Fee Payment and 312 Amendment filed Jun. 21, 2010, 23 pages.
U.S. Appl. No. 11/006,446 Rule 312 Amendment mailed Aug. 19, 2010, 2 pages.
U.S. Appl. No. 11/006,446 Formal drawings mailed Aug. 25, 2010, 29 pages.
U.S. Appl. No. 11/006,446 Issue Notification mailed Sep. 1, 2010, 1 page.
U.S. Appl. No. 12/830,236 Divisional Application filed Jul. 2, 2010, 103 pages.
U.S. Appl. No. 12/830,236 Notice to File Corrected Application Papers mailed Jul. 16, 2010, 5 pages.
U.S. Appl. No. 12/830,236 Response to Notice to File Corrected Application Papers mailed Aug. 25, 2010, 32 pages.
U.S. Appl. No. 12/830,236 Filing receipt mailed Sep. 3, 2010, 3 pages.
U.S. Appl. No. 12/830,236 Notice of Publication mailed Dec. 16, 2010, 1 page.
U.S. Appl. No. 12/830,236 Restriction requirement mailed Mar. 18, 2011, 6 pages.
U.S. Appl. No. 12/830,236 Restriction requirement response, mailed Apr. 18, 2011, 5 pages.
U.S. Appl. No. 12/830,236 Non-Final Office Action, mailed May 11, 2011, 10 pages.
U.S. Appl. No. 12/830,236 Response to Non-Final Office Action mailed Jul. 6, 2011, 18 pages.
U.S. Appl. No. 12/830,236 Final Office Action, mailed Oct. 14, 2011, 18 pages.
U.S. Appl. No. 12/830,236 Amendment after final, filed Jan. 17, 2012, 26 pages.
U.S. Appl. No. 12/830,236 Advisory Action, mailed Feb. 8, 2012, 6 pages.
U.S. Appl. No. 12/830,236 Notice of Appeal filed Mar. 8, 2012, 3 pages.
U.S. Appl. No. 12/830,236 RCE, filed Jun. 5, 2012, 23 pages.
U.S. Appl. No. 12/830,236 Non-Final Office Action, mailed Jul. 31, 2012, 18 pages.
U.S. Appl. No. 12/830,236 Amendment, filed Nov. 1, 2012, 27 pages.
U.S. Appl. No. 12/830,236 Final Office Action, mailed Feb. 27, 2013, 35 pages.
U.S. Appl. No. 12/830,236 Response after final, mailed Jun. 27, 2013, 36 pages.
U.S. Appl. No. 12/830,236 Advisory action, mailed Jul. 12, 2013, 4 pages.
U.S. Appl. No. 12/830,236 Notice of appeal, filed Jul. 19, 2013, 2 pages.
U.S. Appl. No. 12/830,236 Appeal brief, filed Sep. 18, 2013, 44 pages.
U.S. Appl. No. 12/830,236 Examiners answer to appeal brief, mailed Dec. 18, 2013, 35 pages.
U.S. Appl. No. 12/830,236 Reply Brief as Filed on Feb. 18, 2014, 16 Pages.
U.S. Appl. No. 12/830,236 Appeal Docketing Notice, Mailed Mar. 21, 2014, 2 Pages.
U.S. Appl. No. 11/385,257, filed Mar. 20, 2006, 118 pages.
U.S. Appl. No. 11/385,257 Notice of Missing Parts mailed May 3, 2006, 2 pages.
U.S. Appl. No. 11/385,257 Response to Missing Parts filed Aug. 3, 2006, 46 pages.
U.S. Appl. No.11/385,257 Notice of Publication mailed Nov. 30, 2006, 1 page.
U.S. Appl. No. 11/385,257 Non-final Office Action mailed Apr. 29, 2008, 44 pages.
U.S. Appl. No. 11/385,257 Amendment filed Jul. 29, 2008, 29 pages.
U.S. Appl. No. 11/385,257 Final Office Action mailed Dec. 9, 2008, 47 pages.
U.S. Appl. No. 11/385,257 RCE with Amendment filed May 11, 2009, 38 pages.
U.S. Appl. No. 11/385,257 Supplemental Amendment filed May 26, 2009, 32 pages.
U.S. Appl. No. 11/385,257 Notice of Non-Compliant Amendment mailed Jun. 1, 2009, 3 pages.
U.S. Appl. No. 11/385,257 Amendment filed Jun. 30, 2009, 34 pages.
U.S. Appl. No. 11/385,257 Non-final Office Action mailed Sep. 14, 2009, 60 pages.
U.S. Appl. No. 11/385,257 Response to Non-Final Office Action filed Jan. 13, 2010, 34 pages.
U.S. Appl. No. 11/385,257 Final Office Action mailed Apr. 12, 2010, 47 pages.
U.S. Appl. No. 11/385,257 RCE mailed Aug. 12, 2010, 35 pages.
U.S. Appl. No. 11/385,257 Office Action mailed Sep. 30, 2010, 39 pages.
U.S. Appl. No. 11/385,257 Office Action response, mailed Mar. 29, 2011, 31 pages.
U.S. Appl. No. 11/385,257 Final Rejection mailed Jun. 1, 2011, 40 pages.
U.S. Appl. No. 11/385,257 Request for continued Examination mailed Nov. 1, 2011, 30 pages.
U.S. Appl. No. 11/385,257 Non-Final Office Action, mailed Jan. 9, 2012, 40 pages.
U.S. Appl. No. 11/385,257 Amendment, mailed Apr. 6, 2012, 30 pages.
U.S. Appl. No. 11/385,257 Notice of allowance and Examiner interview summary, mailed Jun. 22, 2012, 36 pages.
U.S. Appl. No. 11/385,257 Office communication concerning previous IDS filing, mailed Oct. 4, 2012, 4 pages.
U.S. Appl. No. 11/385,257 Miscellaneous Communication to Applicant, mailed Oct. 15, 2012, 3 pages.
U.S. Appl. No. 11/385,257 Rule 312 Amendment, mailed Dec. 12, 2012, 10 pages.
U.S. Appl. No. 11/385,257 Issue Notification, mailed Dec. 22, 2012, 1 page.
U.S. Appl. No. 13/625,812, filed Sep. 24, 2012, 123 pages.
U.S. Appl. No. 13/625,812 Notice to file missing parts, mailed Oct. 15, 2012, 6 pages.
U.S. Appl. No. 13/625,812 Response to Notice to file missing parts and preliminary amendment, mailed Mar. 8, 2013, 47 pages.
U.S. Appl. No. 13/625,812 Notice of incomplete reply, mailed Mar. 15, 2013, 3 pages.
U.S. Appl. No. 13/625,812 Response to incomplete reply notice, mailed Apr. 2, 2013, 5 pages.
U.S. Appl. No. 13/625,812 Non-Final office action, mailed Jul. 26, 2013, 29 pages.
U.S. Appl. No. 13/625,812 Publication notice, mailed Aug. 1, 2013, 1 page.
U.S. Appl. No. 13/625,812 Response to non-final office action, mailed Oct. 9, 2013, 15 pages.
U.S. Appl. No. 13/625,812 Final rejection, mailed Dec. 3, 2013, 28 pages.
U.S. Appl. No. 13/625,812 Response After Final Action, Mailed Apr. 1, 2014, 1 Page.
U.S. Appl. No. 13/625,812 Advisory Action (PTOL-303), Mailed Apr. 9, 2014, 3 Pages.
U.S. Appl. No. 13/625,812 Notice of Appeal, filed May 5, 2014, 1 Page.

(56) References Cited

OTHER PUBLICATIONS

U.S. Appl. No. 13/625,812 Request for Continued Examination, Mailed Aug. 4, 2014, 18 Pages.
U.S. Appl. No. 13/625,812 Request for Corrected Filing Receipt, Mailed Aug. 21, 2014, 6 Pages.
U.S. Appl. No. 13/625,812 Filing Receipt, Mailed Aug. 27, 2014, 3 Pages.
U.S. Appl. No. 11/319,758, filed Dec. 27, 2005, 79 pages.
U.S. Appl. No. 11/319,758 Notice of Missing Parts mailed Feb. 1, 2006, 2 pages.
U.S. Appl. No. 11/319,758 Response to Missing Parts filed Jul. 3, 2006, 15 pages.
U.S. Appl. No. 11/319,758 Non-final Office Action mailed Nov. 12, 2008, 46 pages.
U.S. Appl. No. 11/319,758 Amendment filed May 12, 2009, 40 pages.
U.S. Appl. No. 11/319,758 Final Office Action mailed Aug. 3, 2009, 39 pages.
U.S. Appl. No. 11/319,758 RCE filed Jan. 4, 2010, 45 pages.
U.S. Appl. No. 11/319,758 Non-Final Office Action mailed Mar. 30, 2010, 39 pages.
U.S. Appl. No. 11/319,758 Office Action response mailed Jul. 29, 2010, 30 pages.
U.S. Appl. No. 11/319,758 Final Office Action mailed Oct. 28, 2010, 31 pages.
U.S. Appl. No. 11/319,758 Request for Continued Examination, mailed Mar. 28, 2011, 32 pages.
U.S. Appl. No. 11/319,758 Non-Final office action mailed Jun. 3, 2011, 31 pages.
U.S. Appl. No. 11/319,758 Non-Final Office Action Response mailed Nov. 3, 2011, 29 pages.
U.S. Appl. No. 11/319,758 Final Office Action, mailed Jan. 17, 2012, 22 pages.
U.S. Appl. No. 11/319,758 Amendment after final, mailed May 17, 2012, 34 pages.
U.S. Appl. No. 11/319,758 Advisory Action, mailed Jun. 20, 2012, 3 pages.
U.S. Appl. No. 11/319,758 Amendment after final, mailed Jun. 28, 2012, 29 pages.
U.S. Appl. No. 11/319,758 Notice of Allowance and examiner's interview summary, mailed Jul. 17, 2012, 10 pages.
U.S. Appl. No. 11/319,758 Issue Fee payment, Rule 312 and Miscellaneous Communication, mailed Oct. 12, 2012, 12 pages.
U.S. Appl. No. 11/319,758 Issue Notification, mailed Oct. 31, 2012, 1 page.
U.S. Appl. No. 13/632,581, filed Oct. 1, 2012, 88 Pages.
U.S. Appl. No. 13/632,581 Notice to File Missing Parts and Filing Receipt, Mailed Oct. 22, 2012, 27 Pages.
U.S. Appl. No. 13/632,581 Notice of Publication, Mailed Jun. 13, 2013, 1 Page.
U.S. Appl. No. 13/632,581 Non-final Office Action, Mailed Jul. 3, 2013, 22 Pages.
U.S. Appl. No. 13/632,581 Non-Final Office Action Response, Mailed Sep. 11, 2013, 23 Pages.
U.S. Appl. No. 13/632,581 Final Office Action, Mailed Dec. 18, 2013, 27 Pages.
U.S. Appl. No. 13/632,581 Response After Final Action, Mailed Mar. 18, 2014, 37 Pages.
U.S. Appl. No. 13/632,581 Advisory Action (PTOL-303), Mailed Apr. 3, 2014, 4 Pages.
U.S. Appl. No. 13/632,581 Notice of Appeal Filed Jul. 17, 2014, 2 Pages.
U.S. Appl. No. 13/632,581 Request for Continued Examination, Mailed Jul. 16, 2014, 23 Pages.
U.S. Appl. No. 11/006,842, filed Dec. 7, 2004, 58 pages.
U.S. Appl. No. 11/006,842 Notice to file missing parts Jan. 10, 2005, 2 pages.
U.S. Appl. No. 11/006,842 Response to Notice to file missing parts mailed Apr. 1, 2005, 7 pages.
U.S. Appl. No. 11/006,842 Preliminary Amendment mailed May 2, 2005, 93 pages.
U.S. Appl. No. 11/006,842 Restriction Requirement mailed Jan. 23, 2008, 5 pages.
U.S. Appl. No. 11/006,842 Response to Restriction Requirement mailed Feb. 25, 2008, 25 pages.
U.S. Appl. No. 11/006,842 Restriction Requirement mailed May 13, 2008, 5 pages.
U.S. Appl. No. 11/006,842 Response to Restriction Requirement Aug. 13, 2008, 24 pages.
U.S. Appl. No. 11/006,842 Non-Final Office Action mailed Nov. 3, 2008.
U.S. Appl. No. 11/006,842 Response to Non-Final Office Action mailed May 4, 2009, 35 pages.
U.S. Appl. No. 11/006,842 Supplemental Response mailed Jul. 17, 2009, 23 pages.
U.S. Appl. No. 11/006,842 Notice of Allowance mailed Jul. 27, 2009, 13 pages.
U.S. Appl. No. 11/006,842 Issue Fee filed Oct. 27, 2009, 1 page.
U.S. Appl. No. 11/006,842 Issue notification mailed Nov. 18, 2009, 1 page.
U.S. Appl. No. 12/613,450 Continuation application filed Nov. 5, 2009, 63 pages.
U.S. Appl. No. 12/613,450 Notice of Missing Parts mailed Nov. 18, 2009, 2 pages.
U.S. Appl. No. 12/613,450 Preliminary Amendment and Response to Missing Parts filed Jan. 19, 2010, 16 pages.
U.S. Appl. No. 12/613,450 Filing receipt mailed Jan. 27, 2010, 3 pages.
U.S. Appl. No. 12/613,450 Notice of Publication mailed May 5, 2010, 1 page.
U.S. Appl. No. 12/613,450 Restriction requirement mailed Jun. 10, 2011, 5 pages.
U.S. Appl. No. 12/613,450 Response to restriction requirement mailed Jul. 6, 2011, 17 pages.
U.S. Appl. No. 12/613,450 Non-Final Office Action, mailed Aug. 25, 2011, 15 pages.
U.S. Appl. No. 12/613,450 Non-Final OA response mailed Dec. 27, 2011, 28 pages.
U.S. Appl. No. 12/613,450 Final rejection, mailed Feb. 14, 2012, 14 pages.
U.S. Appl. No. 12/613,450 Amendment after final, mailed Jun. 8, 2012, 23 pages.
U.S. Appl. No. 12/613,450 Advisory Action, mailed Jun. 20, 2012, 4 pages.
U.S. Appl. No. 12/613,450 RCE, mailed Jul. 12, 2012, 25 pages.
U.S. Appl. No. 12/613,450 Notice of Allowance, mailed Oct. 7, 2013, 20 pages.
U.S. Appl. No. 12/613,450 Electronic Terminal Disclaimer filed and approved, Jan. 2, 2014, 2 pages.
U.S. Appl. No. 12/613,450 Amendment After Final or Under 37CFR 1.312 Mailed Jan. 14, 2014, 2 Pages.
U.S. Appl. No. 12/613,450 Issue Notification, Mailed Jan. 22, 2014, 1 Page.
U.S. Appl. No. 14/149,749, filed Jan. 7, 2014, 59 Pages.
U.S. Appl. No. 14/149,749 Notice to File Missing Parts and Filing Receipt, Mailed Jan. 23, 2014, 6 Pages.
U.S. Appl. No. 11/149,749 Applicant Response to Pre-exam Formalities Notice, Mailed May 23, 2014 12 Pages.
U.S. Appl. No. 14/149,749 Applicant Response to Pre-Exam Formalities Notice, Mailed Aug. 25, 2014, 103 Pages.
U.S. Appl. No. 14/149,749 Filing Receipt, Mailed Sep. 4, 2014, 3 Pages.
U.S. Appl. No. 11/320,538, filed Dec. 27, 2005, 76 pages.
U.S. Appl. No. 11/320,538 Notice of Missing Parts mailed Feb. 2, 2006, 2 pages.
U.S. Appl. No. 11/320,538 Response to Missing Parts filed Aug. 2, 2006, 36 pages.
U.S. Appl. No. 11/320,538 Non-final Office Action mailed Apr. 1, 2009, 27 pages.
U.S. Appl. No. 11/320,538 Amendment filed Jul. 1, 2009, 54 pages.
U.S. Appl. No. 11/320,538 Final Office Action mailed Nov. 2, 2009, 29 pages.
U.S. Appl. No. 11/320,538 Response to Final Office Action filed Jan. 4, 2010, 23 pages.

(56) References Cited

OTHER PUBLICATIONS

U.S. Appl. No. 11/320,538 Advisory Action mailed Jan. 19, 2010, 3 pages.
U.S. Appl. No. 11/320,538 RCE and Amendment filed Apr. 2, 2010, 26 pages.
U.S. Appl. No. 11/320,538 Non-Final Office Action mailed Jun. 9, 2010, 24 pages.
U.S. Appl. No. 11/320,538 Office action mailed Dec. 22, 2010, 10 pages.
U.S. Appl. No. 11/320,538 Notice of Appeal, mailed May 23, 2011, 6 pages.
U.S. Appl. No. 11/320,538 Pre-brief appeal conference decision mailed Jun. 30, 2011, 2 pages.
U.S. Appl. No. 11/320,538 Request for Continued Examination mailed Dec. 23, 2011, 21 pages.
U.S. Appl. No. 11/320,538 Non-Final Office Action, mailed Dec. 19, 2012, 12 pages.
U.S. Appl. No. 11/320,538 Response to Non-final office action, mailed Apr. 17, 2013, 20 pages.
U.S. Appl. No. 11/320,538 Notice of allowance, mailed Aug. 1, 2013, 25 pages.
U.S. Appl. No. 11/320,538 Issue fee payment, mailed Nov. 1, 2013, 7 pages.
U.S. Appl. No. 11/320,538 Rule 312 amendment, mailed Nov. 19, 2013, 20 pages.
U.S. Appl. No. 11/320,538 Issue Notification, mailed Dec. 4, 2013, 1 page.
U.S. Appl. No. 14/086,741, filed Dec. 12, 2013, 77 Pages.
U.S. Appl. No. 14/086,741 Filing Receipt and Notice to File Missing Parts, Mailed Dec. 12, 2013, 6 Pages.
U.S. Appl. No. 14/086,741 Applicant Response to Pre-Exam Formalities Notice, Mailed Jun. 12, 2014, 60 Pages.
U.S. Appl. No. 14/086,741 Filing Receipt, Mailed Jun. 17, 2014, 3 Pages.
U.S. Appl. No. 14/086,741 Notice of Publication, Mailed Sep. 25, 2014, 1 Page.
U.S. Appl. No. 14/086,741 Terminal Disclaimer as Filed on Sep. 29, 2014, 1 Page.
U.S. Appl. No. 14/086,741 Terminal Disclaimer Review Decision, Mailed Sep. 30, 2014, 1 Page.
U.S. Appl. No. 14/086,741 Notice of Allowance and Fees and Examiner Summary, Mailed Oct. 3, 2014, 21 pages.
U.S. Appl. No. 11/361,500, filed Feb. 23, 2006, 72 pages.
U.S. Appl. No. 11/361,500 Notice to file missing parts mailed Mar. 23, 2006, 2 pages.
U.S. Appl. No. 11/361,500 Response to Notice to File Missing Parts mailed Jul. 19, 2006, 27 pages.
U.S. Appl. No. 11/361,500 Notice of Publication mailed Nov. 16, 2006, 1 page.
U.S. Appl. No. 11/361,500 Office Action mailed May 27, 2009, 18 pages.
U.S. Appl. No. 11/361,500 Response to Office Action mailed Aug. 27, 2009, 34 pages.
U.S. Appl. No. 11/361,500 Notice of Allowance mailed Dec. 11, 2009, 8 pages.
U.S. Appl. No. 11/361,500 Issue Fee Payment and Rule 312 Amendment mailed Jan. 6, 2010, 28 pages.
U.S. Appl. No. 11/361,500 Response to Rule 312 Amendment Jan. 25, 2010, 4 pages.
U.S. Appl. No. 11/361,500 Issue Notification mailed Feb. 24, 2010, 1 page.
U.S. Appl. No. 12/702,243 Continuation Application with Preliminary Amendment filed Feb. 8, 2010, 83 pages.
U.S. Appl. No. 12/702,243 Notice of Missing Parts mailed Feb. 25, 2010, 2 pages.
U.S. Appl. No. 12/702,243 Response to Missing Parts filed Apr. 26, 2010, 8 pages.
U.S. Appl. No. 12/702,243 Filing receipt mailed May 4, 2010, 3 pages.
U.S. Appl. No. 12/702,243 Notice of Publication mailed Aug. 12, 2010, 1 page.
U.S. Appl. No. 12/702,243, Non-Final rejection, mailed Aug. 30, 2012, 8 pages.
U.S. Appl. No. 12/702,243 Amendment, mailed Nov. 20, 2012, 14 pages.
U.S. Appl. No. 12/702,243 Terminal Disclaimer, mailed Jan. 2, 2013, 5 pages.
U.S. Appl. No. 12/702,243 Terminal Disclaimer decision, mailed Jan. 4, 2013, 1 page1.
U.S. Appl. No. 12/702,243 Notice of allowance and fees due and examiner interview summary, mailed Jan. 10, 2013, pages.
U.S. Appl. No. 12/702,243 Issue notification, mailed Apr. 24, 2013, 1 page.
U.S. Appl. No. 13/860,482, filed Apr. 10, 2013, 98 Pages.
U.S. Appl. No. 13/860,482 Notice to File Missing Parts and Filing Receipt, Mailed May 21, 2013, 5 Pages.
U.S. Appl. No. 13/860,482 Applicant Response to Pre-Exam Formalities Notice, Mailed Oct. 22, 2013, 3 Pages.
U.S. Appl. No. 13/860,482 Notice of Publication, Mailed Feb. 6, 2014, 1 Page.
U.S. Appl. No. 13/860,482 Non-Final Office Action, Mailed Jun. 9, 2014, 11 Pages.
U.S. Appl. No. 13/860,482 Non-Final Office Action Response, Mailed Sep. 8, 2014, 19 Pages.
U.S. Appl. No. 13/860,482 Terminal Disclaimer Review Decision, Sep. 9, 2014, 1 page.
U.S. Appl. No. 11/412,417, filed Apr. 26, 2006, 96 pages.
U.S. Appl. No. 11/412,417 Notice of Missing Parts mailed May 19, 2006, 2 pages.
U.S. Appl. No. 11/412,417 Response to Notice of Missing Parts filed Jul. 19, 2006, 14 pages.
U.S. Appl. No. 11/412,417 Non-final Office Action mailed Apr. 1, 2008, 53 pages.
U.S. Appl. No. 11/412,417 Amendment filed Aug. 1, 2008, 34 pages.
U.S. Appl. No. 11/412,417 Final Office Action mailed Nov. 13, 2008, 40 pages.
U.S. Appl. No. 11/412,417 RCE and Amendment filed May 12, 2009, 36 pages.
U.S. Appl. No. 11/412,417 Non-final Office Action mailed Jun. 30, 2009, 141 pages.
U.S. Appl. No. 11/412,417 Examiner Interview Summary mailed Oct. 30, 2009, 3 pages.
U.S. Appl. No. 11/412,417 Amendment filed Oct. 30, 2009, 33 pages.
U.S. Appl. No. 11/412,417 Final Office Action mailed Jan. 4, 2010, 37 pages.
U.S. Appl. No. 11/412,417 RCE with Amendment filed May 4, 2010, 27 pages.
U.S. Appl. No. 11/412,417 Supplemental Office Action Response mailed Jun. 22, 2010, 22 pages.
U.S. Appl. No. 11/412,417 Notice of Allowance and bibliographic data sheet mailed Jul. 6, 2010, 9 pages.
U.S. Appl. No. 11/412,417 RCE mailed Oct. 5, 2010, 4 pages.
U.S. Appl. No. 11/412,417 Notice of Allowance and bibliographic data sheet mailed Oct. 26, 2010, 4 pages.
U.S. Appl. No. 11/412,417 Issue Fee Payment and Comments on Reasons for Allowance mailed Jan. 26, 2011, 6 pages.
U.S. Appl. No. 11/412,417 Issue Notification mailed Feb. 9, 2011, 1 page.
U.S. Appl. No. 13/030,084, filed Feb. 17, 2011, 103 pages.
U.S. Appl. No. 13/030,084 Filing receipt and Notice to File Missing parts mailed Mar. 3, 2011, 6 pages.
U.S. Appl. No. 13/030,084 Response to Notice to File Missing Parts, mailed Aug. 3, 2011, 23 pages.
U.S. Appl. No. 13/030,084 Updated filing receipt, mailed Aug. 11, 2011, 3 pages.
U.S. Appl. No. 13/030,084 Non-Final Rejection mailed Oct. 26, 2011, 34 pages.
U.S. Appl. No. 13/030,084 Notice of Publication mailed Nov. 17, 2011, 1 page.
U.S. Appl. No. 13/030,084 Amendment, mailed Jan. 26, 2012, 35 pages.

(56) References Cited

OTHER PUBLICATIONS

U.S. Appl. No. 13/030,084 Notice regarding non-compliant amendment, mailed Jan. 31, 2012, 4 pages.
U.S. Appl. No. 13/030,084 Amendment, mailed Feb. 9, 2012, 35 pages.
U.S. Appl. No. 13/030,084 Final Rejection, mailed Mar. 28, 2012, 62 pages.
U.S. Appl. No. 13/030,084 Amendment after final, mailed Jun. 14, 2012, 88 pages.
U.S. Appl. No. 13/030,084 Advisory Action, mailed Jun. 26, 2012, 4 pages.
U.S. Appl. No. 13/030,084 RCE, mailed Jul. 23, 2012, 89 pages.
U.S. Appl. No. 13/030,084 Notice regarding non-compliant amendment, mailed Jul. 25, 2012, 2 pages.
U.S. Appl. No. 13/030,084 Amendment, mailed Jan. 2, 2013, 40 pages.
U.S. Appl. No. 13/030,084 Refund request, mailed Jan. 23, 2013 17 pages.
U.S. Appl. No. 13/030,084 Non-Final office action, mailed Apr. 30, 2013, 39 pages.
U.S. Appl. No. 13/030,084 Response to non-final office action, mailed Jul. 30, 2013, 28 pages.
U.S. Appl. No. 13/030,084 Non-final office action, mailed Oct. 10, 2013, 44 pages.
U.S. Appl. No. 13/030,084 Response after Non-Final Reject, Mailed Jan. 2, 2014, 1 Page.
U.S. Appl. No. 13/030,084 Final Rejection, Mailed Mar. 19, 2014, 41 Pages.
U.S. Appl. No. 13/030,084 Amendment Submitted/Entered with Filing of CPA/RCE, Mailed May 19, 2014, 38 Pages.
U.S. Appl. No. 13/030,084 Advisory Action (PTOL-303), Mailed Jun. 6, 2014, 4 Pages.
U.S. Appl. No. 13/030,084 Applicant Initiated Interview Summary (PTOL-413), Mailed Jul. 1, 2014, 3 Pages.
U.S. Appl. No. 13/030,084 Request for Continued Examination, Mailed Aug. 15, 2014, 26 Pages.
U.S. Appl. No. 11/480,094, filed Jun. 29, 2006, 125 pages.
U.S. Appl. No. 11/480,094 Notice to File Corrected Application Papers mailed Aug. 2, 2006, 2 pages.
U.S. Appl. No. 11/480,094 Response to Notice to File Corrected Application Papers filed Nov. 2, 2006, 32 pages.
U.S. Appl. No. 11/480,094 Filing Receipt mailed Dec. 7, 2006, 3 pages.
U.S. Appl. No. 11/480,094 Non-final Office Action mailed Nov. 7, 2008, 28 pages.
U.S. Appl. No. 11/480,094 Amendment filed May 7, 2009, 37 pages.
U.S. Appl. No. 11/480,094 Final Office Action mailed Jul. 28, 2009, 16 pages.
U.S. Appl. No. 11/480,094 RCE with Amendment filed Dec. 28, 2009, 39 pages.
U.S. Appl. No. 11/480,094 Office Action mailed Dec. 15, 2010, 15 pages.
U.S. Appl. No. 11/480,094 Office Action response, mailed May 16, 2011, 29 pages.
U.S. Appl. No. 11/480,094 Final Office Action, mailed Aug. 1, 2011, 13 pages.
U.S. Appl. No. 11/480,094 Amendment after final Nov. 1, 2011, 32 pages.
U.S. Appl. No. 11/480,094 Advisory Action mailed Nov. 14, 2011, 3 pages.
U.S. Appl. No. 11/480,094 Notice of Appeal mailed Nov. 28, 2011, 1 page.
U.S. Appl. No. 11/480,094 Abandonment, mailed Jul. 31, 2012, 2 pages.
U.S. Appl. No. 13/632,581, Filing Receipt, Mailed Mar. 5, 2013, 3 Pages.
Alderson et al., "Toward an Optimization Driven Framework for Designing and Generating Realistic Internet Topologies" ACM Sigcomm Computer Communications Review 41, vol. 33, No. 1, pp. 41-46, 2003.
Benedikt et al., "Definable Relations and First-Order Query Languages over Strings" Journal of the Acm, vol. 50, No. 5, pp. 694-751, 2003.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Malhotra et al, "A Methodology for Formal Expression of Hierarchy in Model Solution", IEEE, pp. 258-267,1983.
Sproat et al., "Compilation of Weighted Finite-State Tranducers from Decision Trees" ACM, pp. 215-222, 1996.
U.S. Appl. No. 13/229,624 Final Rejection. Mailed Oct. 30, 2014, 6 pages.
U.S. Appl. No. 14/086,837 Terminal Disclaimer, Filed Nov. 14, 2014, 1 page.
U.S. Appl. No. 14/086,837 Examiner's search strategy and results, mailed Dec. 2, 2014, 9 pages.
U.S. Appl. No. 14/086,837 Notice of Allowance and Fees, Mailed Dec. 2, 2014, 17 pages.
U.S. Appl. No. 13/625,812 Notice of Allowance and Fees, mailed Dec. 9, 2014, 20 pages.
U.S. Appl. No. 13/632,581 Notice of Non-Responsive, Non-Compliant Amendment, mailed Oct. 20, 2014, 5 pages.
U.S. Appl. No. 13/632,581 Notice Non-Compliant Amendment, Mailed Oct. 20, 2014, 5 pages.
U.S. Appl. No. 13/632,581 Amendment/Req Reconsideration after Non-Final Reject, Filed Nov. 4, 2014, 16 pages.
U.S. Appl. No. 14/149,749 Notice of Publication, mailed Dec. 11, 2014, 1 page.
U.S. Appl. No. 13/860,482 Terminal Disclaimer Filed, Dec. 8, 2014, 1 page.
U.S. Appl. No. 13/860,482 Terminal Disclaimer Filed, Oct. 8, 2014, 1 page.
U.S. Appl. No. 13/860,482 Terminal Disclaimer Review Decision, Oct. 9, 2014, 1 page.
U.S. Appl. No. 13/860,482 Notice of Allowance and Fees Due, Mailed Nov. 5, 2014, 8 Pages.

* cited by examiner

100

200

300

500

| *Index* | *Binary Edge-Labelled Strings* | *Binary Edge-Labelled Trees* |
|---|---|---|
| 0. | λ [1] | 0 |
| 1. | < > | 1 |
| 2. | <0> | $\#_0 11$ |
| 3. | <1> | $\#_1 11$ |
| 4. | <0, 0> | $\#_0 1 \#_0 11$ |
| 5. | <0, 1> | $\#_0 \#_0 111$ |
| 6. | <1, 0> | $\#_1 1 \#_0 11$ |
| 7. | <1, 1> | $\#_1 \#_0 111$ |
| 8. | <0, 0, 0> | $\#_0 1 \#_0 1 \#_0 11$ |
| 9. | <0, 0, 1> | $\#_1 1 \#_1 11$ |
| 10. | <0, 1, 0> | $\#_0 \#_0 11 \#_0 11$ |
| 11. | <0, 1, 1> | $\#_0 \#_1 111$ |
| 12. | <1, 0, 0> | $\#_1 1 \#_0 1 \#_0 11$ |
| 13. | <1, 0, 1> | $\#_1 \#_1 111$ |
| 14. | <1, 1, 0> | $\#_1 \#_0 111 \#_0 11$ |
| 15. | <1, 1, 1> | $\#_0 \#_0 11 \#_1 11$ |

[1] The Greek lower-case symbol lambda denotes the empty string.

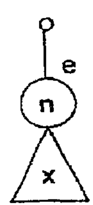
Fig. 9
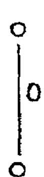
Fig. 10a
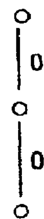
Fig. 10b
Fig. 11a
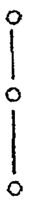
Fig. 11b
4
Fig. 12
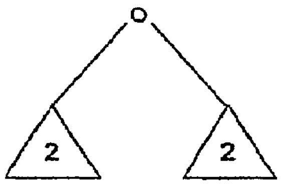
Fig. 13
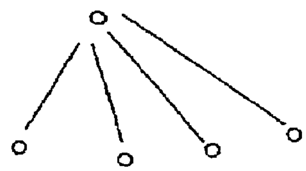
Fig. 14
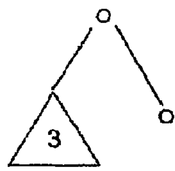
Fig. 15
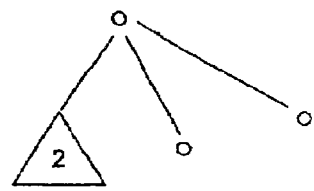
Fig. 16

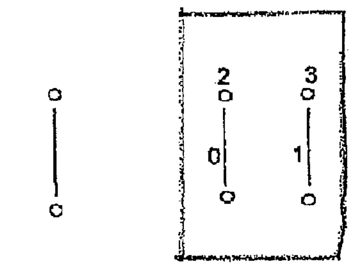
Fig. 18
Fig. 19
Fig. 20
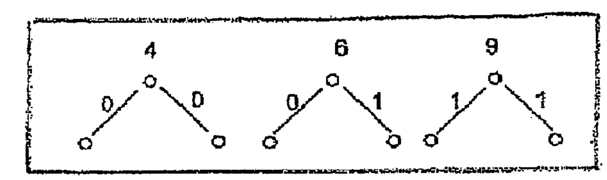
Fig. 21
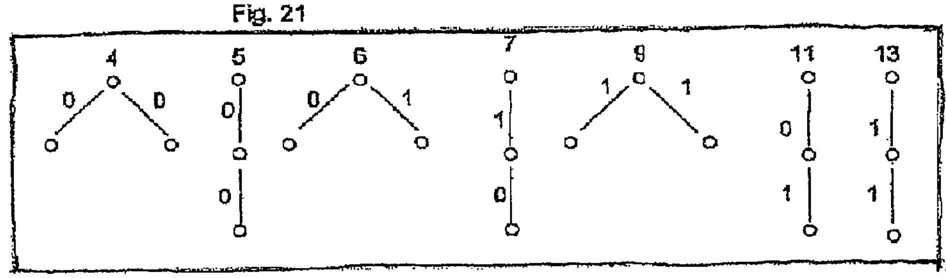
Fig. 22

ENUMERATION OF TREES FROM FINITE NUMBER OF NODES

RELATED APPLICATION

This disclosure claims priority pursuant to 35 USC 119(e) from U.S. Provisional Patent Application Ser. No. 60/632,203, filed on Nov. 30, 2004, by Schiffmann, et al., titled, "ENUMERATION OF TREES FROM FINITE NUMBER OF NODES," assigned to the assignee of the presently claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a table illustrating one embodiment of a linear notation for representing a graphical depiction of a hierarchical set of data;

FIG. 9 is a schematic diagram illustrating a generalized representation of an embodiment of one or more subtrees according to an embodiment.

FIGS. 10*a*, 10*b*, 11*a* and 11*b* are schematic diagrams illustrating applications of one embodiment of a push operation according to an embodiment.

FIGS. 12 through 16 are schematic diagrams illustrating allocations of five nodes among subtree slots for trees having five nodes according to an embodiment.

FIG. 18 is a schematic diagram illustrating a distribution of one unique allocation of a single node depending from a root node.

FIG. 19 is a schematic diagram illustrating BELTs that may be configured from two nodes.

FIGS. 20 through 22 are schematic diagrams illustrating BELTs that may be configured from three nodes.

DETAILED DESCRIPTION

Figure 1:
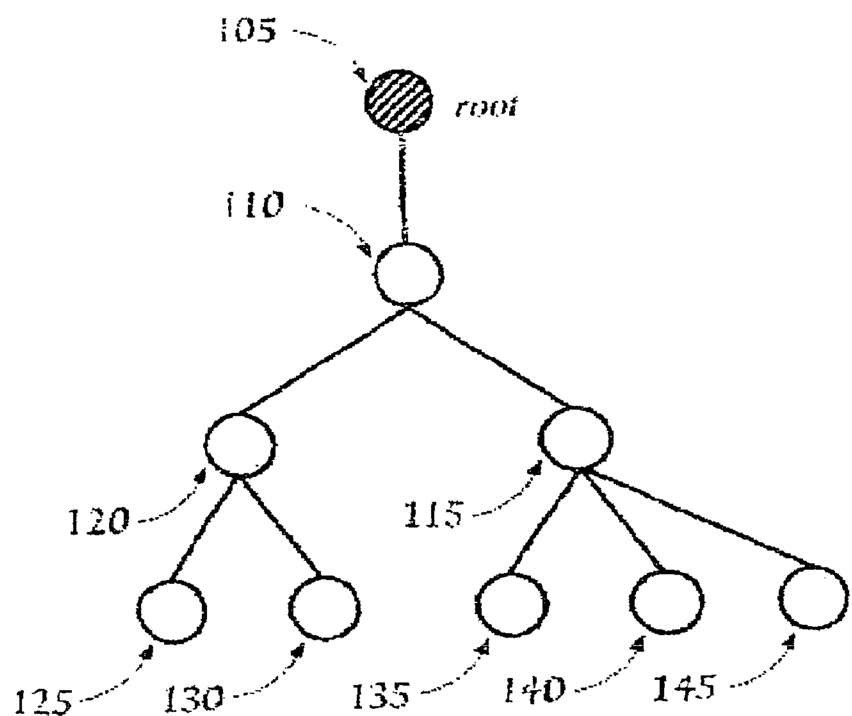
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
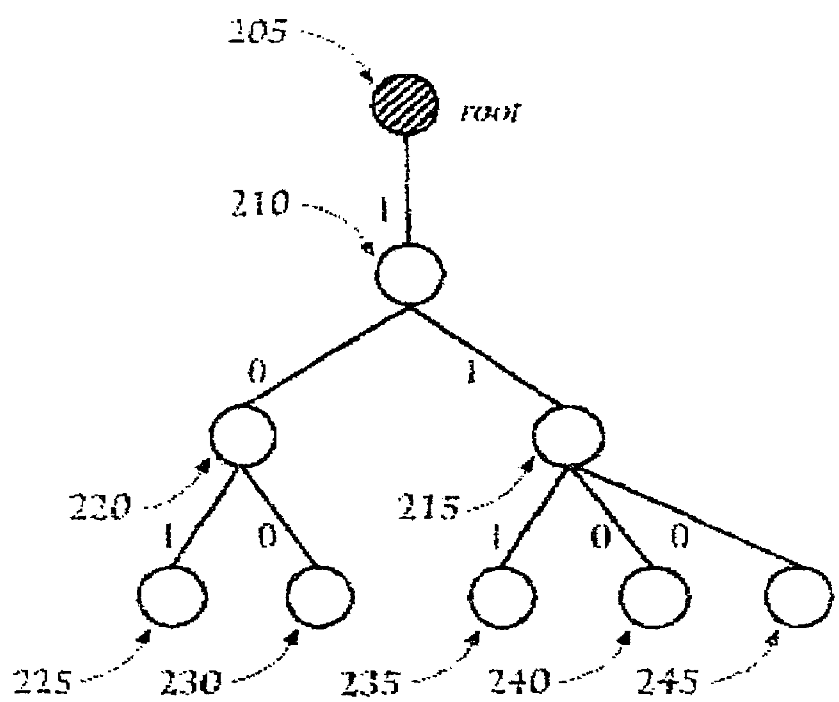
FIG. 2 is a schematic diagram illustrating one embodiment of a binary edge labeled tree (BELT)
Figure 3:
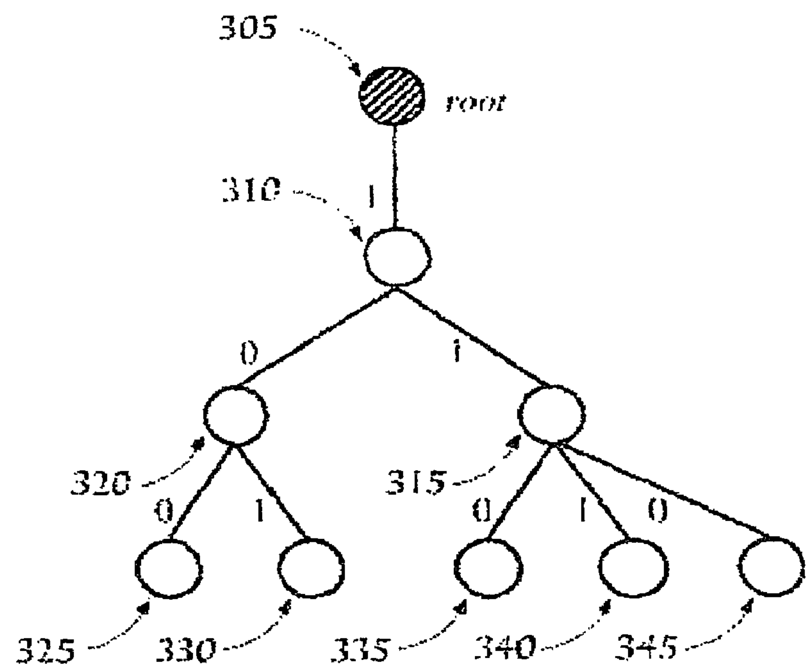
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 4-7 therein.

Figure 4:
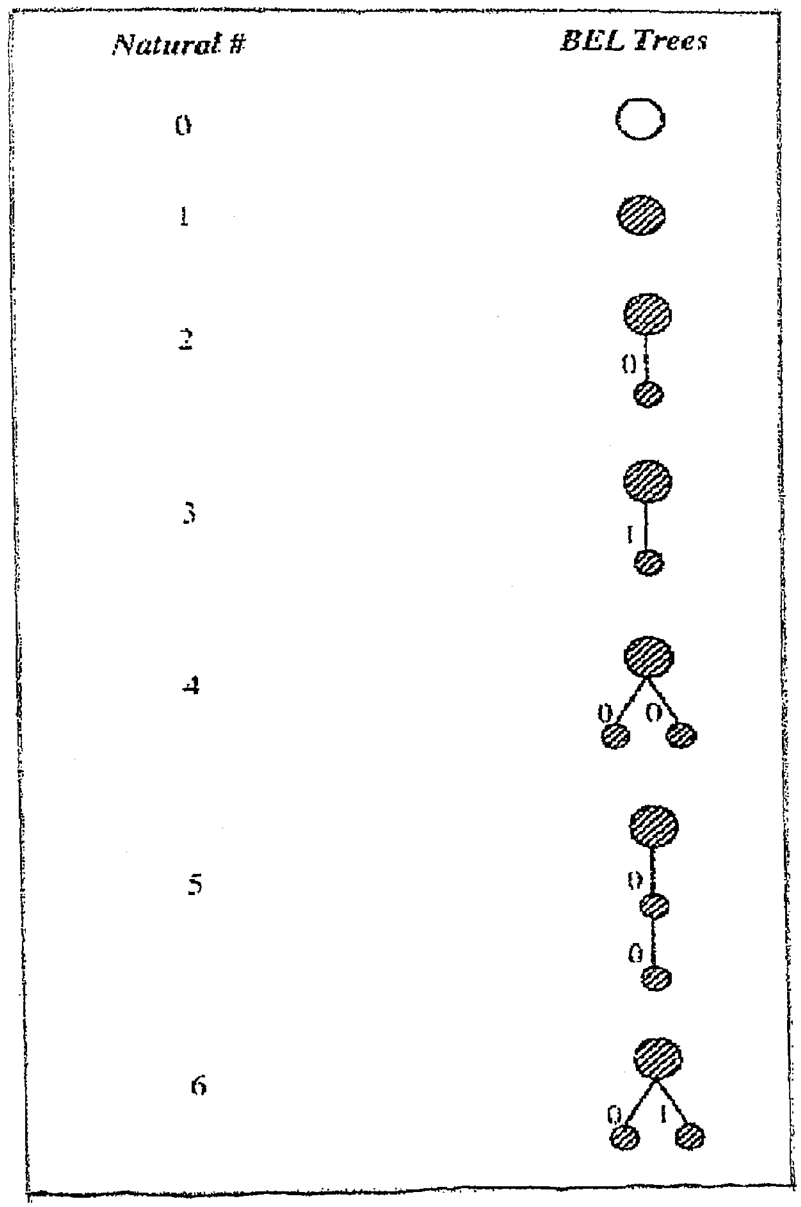
FIG. 4 is a table illustrating a particular embodiment of an association between natural numerals and BELTs.

Binary edge labeled trees may also be enumerated. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive greater than three, where k is the product of u and v, u and v comprising positive s greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 4, as described in more detail below.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 4 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises $2k-1$, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three. This follows from FIG. 5 since $P(2*1)=P(2)=3$. Likewise, the tree at position five is the zero-push of the tree at position 2. Again, this follows from FIG. 5 since $P(2*2-1)=P(3)=5$.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and the claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 7, a node-labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 7:
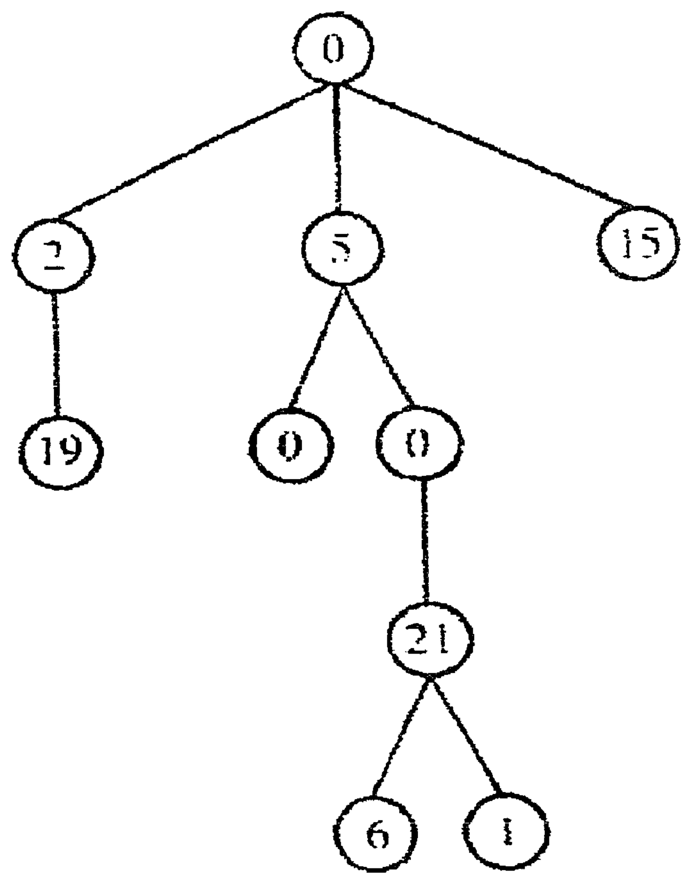
FIG. 7 is a schematic diagram of an embodiment of a node labeled tree.
Figure 8:
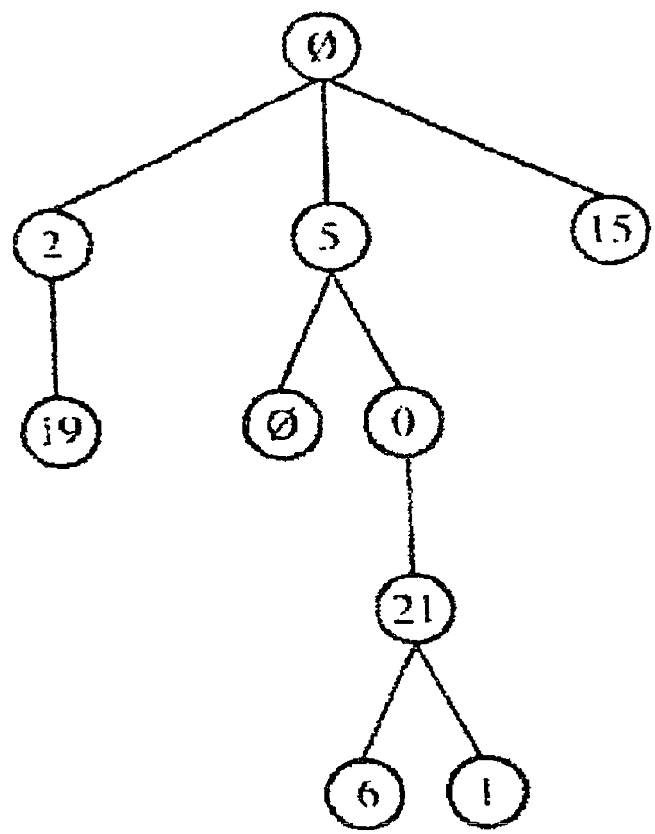
FIG. 8 is a schematic diagram illustrating another embodiment of a node labeled tree.

As previously noted, the claimed subject matter is not limited in scope to this particular example, however, as illustrated in more detail hereinafter, the tree illustrated in FIG. 7 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 1100, is illustrated in FIG. 7, comprises a node labeled tree rather than an edge labeled tree.

Without belaboring the present discussion, a process of converting a node labeled tree such as that illustrated in FIG. 7 to a BELT may be found in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 11-16 therein.

In another embodiment, however, a particular tree may include null types or, more particularly, some node values denoted by the empty set. This is illustrated, for example, by the tree in FIG. 13, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 17-22 therein.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory. An introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

FIG. 6 is a table that illustrates one particular embodiment of employing symbols, concatenated along one spatial dimension, here from left to right, by convention, to represent such a data hierarchy. The table includes four columns. The first column denotes natural numerals. The second column denotes binary strings. The third column denotes a one dimensional arrangement of symbols employed to represent the binary edge labeled trees for that particular position. Of course, as previously described in connection with prior embodiments, the claimed subject matter is not limited in scope to binary strings or binary edge labeled trees. Thus, in alternative embodiments, any tree may be represented with symbols organized in a one dimensional arrangement, as is demonstrated with this particular embodiment.

According to an embodiment, a finite number of trees may be enumerated from a finite number of nodes. For each tree enumerated from the finite number of nodes, a natural numeral may be associated with the enumerated tree based, at least in part, on an association between trees and natural numerals. For example, a set of fully configured, unordered trees may be enumerated from a finite number of nodes. The enumerated trees may then be represented by a corresponding set of natural numerals.

For this particular embodiment, a tree may be expressed as one or more "subtrees" coupled at the root node of the tree. A subtree is coupled to the root node of the tree by an edge and independently has properties of a tree, except that the subtree is part of a larger tree. For example, here, a subtree comprises at least a "root" node coupled by an edge to a root node of the tree. Additional nodes and edges may be coupled to the root node of the subtree. While a subtree may be coupled to a root node of a tree by an edge, the size and shape of the subtree may express information like that of a tree having the same size and shape as the subtree. The subtrees coupled together at the root node of a tree may be referred to as "subtree children" of the root node where a subtree may be referred to as a "subtree child" of the tree in this embodiment.

Figure 5:
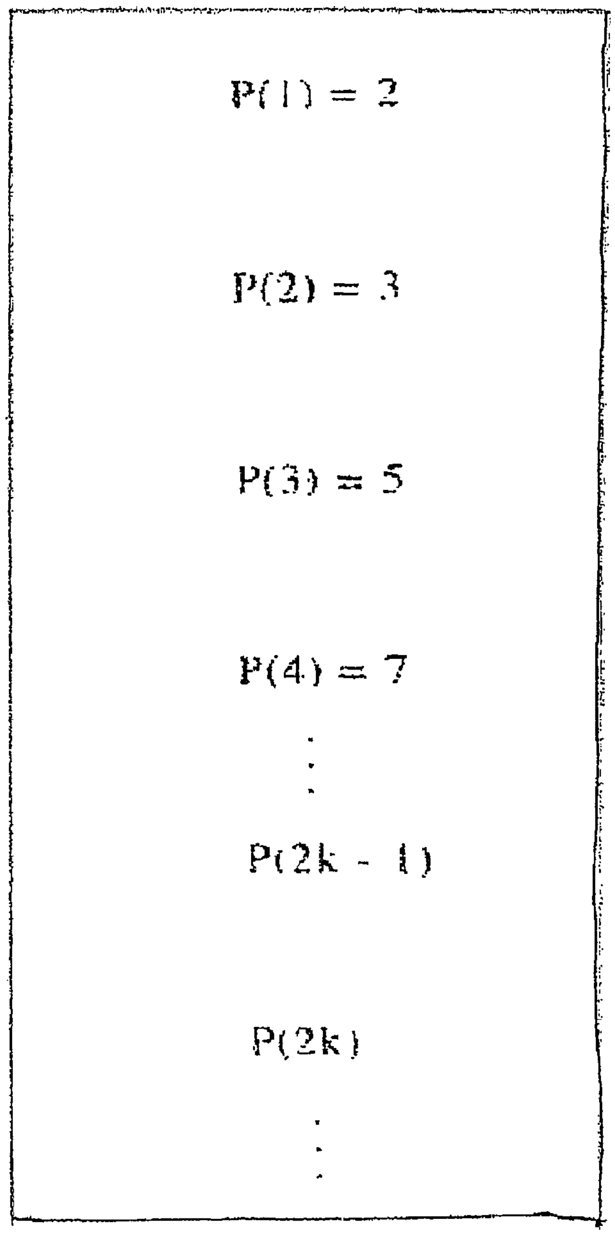
FIG. 5 is a table illustrating a portion of the Kleene enumeration of non-composite numerals.

FIG. 9 is a schematic diagram illustrating a representation an embodiment of one or more subtrees connected via an edge having a label "e" with a subtree root node having a label "n." A value associated with the one or more subtrees may be represented by "x" which may represent information expressed as a natural numeral as illustrated above with reference to FIG. 4. However, this is merely an example of a representation of a subtree and the claimed subject matter is not limited in this respect. Accordingly, the value of the tree shown in FIG. 9 may be expressed as a push of the subtree having the value x. A push operation on the subtree may be represented in relation (1) as follows:

$$<j,k>\text{-push}(x)=P[kx+j-k+(2-r)],\ \text{if } j<k \text{ and } k>0 \quad (1)$$

where:

P(m)=Kleene enumeration function for generating a sequence of non-composite numbers illustrated with reference to FIG. 5;

k=total number of values possible for a label;

j=actual computed label index value;

x=value of "pushed" subtree with edge "e" and root label "n";

r=defined value of tree system root/singleton node (either 0 or 1);

It should be noted that "j" is a function of the specific values of "e" (the specific edge label) and "n" (the specific node label). It should be understood that while the push operation of relation (1) is suitable for performing specific embodiments described herein, this push operation is merely an example of how a push operation may be performed on a subtree and the claimed subject matter is not limited in this respect.

In addition to applying the push operation to a single tree or subtree having a value x, the push operation may be applied to multiple tree or subtree elements of a set in relation (2) as follows:

$$<j,k>\text{-push}[\{a,b,c\}]=\{<j,k>\text{-push}(a)\}U\{<j,k>\text{-push}(b)\}U\{<j,k>\text{-push}(c)\} \quad (2)$$

where a, b and c are numerical representations of tree or subtree elements in the pushed set. The result of the operation of relation (2) may be referred to as a "pushed set" of tree or subtree elements.

FIGS. 10*a*, 10*b*, 11*a* and 11*b* illustrate applications of the push operation of relation (1) to specific subtrees. FIG. 10*a* shows a BELT having a value of "2". As such, x=2, k=2 and r=i. FIG. 10*b* illustrates the result of a push of the tree in FIG. 10*a* by an edge having a label zero (i.e., a zero-push). The value of j for this push operation is zero. Accordingly, the push operation provides a numeral associated with the pushed BELT as follows:

$$<j,k>\text{-push}(x)=P[2*2+0-2+2-1]=P[3]=5.$$

FIG. 11*a* shows a structure-only tree (i.e., a tree with unlabeled elements) with two nodes having a value of x=2. As such, k=1 (since there are no labels) and r=1. FIG. 11*b* illustrates the result of a push of the tree in FIG. 11*a* by an unlabeled edge. The value of j is zero since there are no labels. Accordingly, the push operation determines a numeral associated with the pushed unlabeled tree as follows:

$$<j,k>\text{-push}(x)=P[1*2+0-1+2-1]=P[2]=3.$$

A number of subtrees coupled to a root node of a tree may be configured from one or more "subtree slots." In this embodiment, a subtree slot represents a possible location of a subtree coupled to the root node of a larger tree. For a tree enumerated from a finite number N of nodes, a first node may serve as a root node while the remaining N−1 nodes may be configured into subtrees coupled to the root node. Up to N−1 subtrees may be formed from the remaining N−1 nodes (where each subtree contains a single node coupled to the root node by an edge). Accordingly, N−1 subtree slots may be identified for the set of trees enumerated from N nodes.

For any particular enumerated tree, according to an embodiment, an "arrangement of subtree slots" sets forth an unordered set of subtree slots having a subtree of at least one node. In enumerating a tree from N nodes, for example, one arrangement of subtree slots having a subtree in each of N−1 subtree slots yields a tree having a single node in each of N−1 subtree slots coupled to the root node by an edge. In another arrangement of subtree slots for a tree enumerated from N nodes, for example, a single subtree slot may contain all N−1 nodes. However, these are merely examples of arrangements of subtree slots and that other arrangements may be possible.

A subtree slot in an arrangement of subtree slots may have one or more nodes according to one or more "allocations of nodes" among the subtree slots defining a number of nodes in the subtree slot of the arrangement. In other words, such an allocation of nodes for an arrangement of subtree slots (i.e., the number of subtree slots having at least one node) sets forth the number nodes being allocated to each subtree slot. The nodes allocated to a subtree slot (e.g., according to an allocation of nodes among subtrees) may be set out in one or more possible, unordered configurations of a subtree where a possible configuration may represent a set of data and/or other information in a hierarchy of data using properties of a tree. In a particular embodiment, a configuration of a subtree may comprise a finite, rooted, connected, unordered acyclic graph as illustrated with reference to FIGS. 1-8.

According to an embodiment, a finite number of possible trees or subtrees may be enumerated from a finite number of N nodes. For any tree (or subtree) with N such nodes, there are N−1 available arrangements of subtree children. That is, for a tree (or subtree) with N nodes there may be any arrangement of zero to N−1 subtree children coupled to a root node. Accordingly, an arrangement of subtree children may define up to N−1 subtree slots that may be coupled or merged at a root node of the tree. For any particular arrangement of subtree children (e.g., represented as a count of the number of subtree slots with at least one node coupled to a root node) an allocation of nodes may be expressed as an unordered set containing N−1 elements where an element of the unordered set defines 0 to N−1 nodes for a corresponding subtree slot. An element of the unordered set may represent a count (ranging from 0 to N−1) of a number of nodes being allocated to the corresponding subtree slot. The sum of the counts represented by the elements may then equal N−1.

For any particular allocation of nodes among one or more subtree slots in an arrangement of subtree slots, there may be one or more possible "fully configured trees" defining a relationship among the allocated nodes using each of the allocated nodes. Such a fully configured tree may represent hierarchical data in a finite, rooted, connected, unordered, acyclic graph. Similarly, for an allocation of nodes to a subtree slot, the fully configured tree may comprise a corresponding subtree child representing hierarchical data in a finite, rooted, connected, unordered, acyclic graph. Notation "{FTs: N}" provides a shorthand notation for this particular embodiment to indicate the set of all fully configured trees that may possibly be configured from exactly N nodes under a given set of conditions (e.g., parameters characterizing the type of tree such as k, j, and r as described above in connection with the push operation of relation (1)) Of course, this is merely an example of how a set of fully configured trees from exactly N nodes may be characterized and the claimed subject matter is not limited to this particular approach.

However, continuing with this example, as illustrated in FIGS. 12 through 16, for example, a tree with five nodes may have one to four subtrees where each subtree includes at least one of the five nodes. FIG. 12 shows a single subtree with four nodes, FIGS. 13 and 15 two subtrees, FIG. 16 shows three subtrees and FIG. 14 shows four subtrees.

For any particular arrangement of subtrees with a finite number of nodes, the arrangement may be characterized as having one or more possible allocations of the nodes among the subtrees in the arrangement. Table 1 below illustrates five allocations of five nodes among subtrees among arrangements of one to four subtree slots.

TABLE 1

Allocation of Nodes ($A_i$) Among Subtree Slots

| Allocation Number (i) | Subtree Slots (m) 0 | 1 | 2 | 3 |
|---|---|---|---|---|
| 0 | 4 | 0 | 0 | 0 |
| 1 | 3 | 1 | 0 | 0 |
| 2 | 2 | 2 | 0 | 0 |
| 3 | 2 | 1 | 1 | 0 |
| 4 | 1 | 1 | 1 | 1 |

For this embodiment, an allocation defines a set of unordered elements. Thus, it should be understood that the ordering of allocations of specific quantities of nodes to particular subtree slots (numbered 0 to 3) outlined in Table 1 is arbitrary and that there are other ways to sequence the allocation of nodes among subtree slots. For this particular example, allocation 0 indicates the allocation of four nodes to a single subtree slot 4. The allocation merely represents the allocation of four nodes to a single subtree slot, irrespective of the particularly numbered subtree slot. Accordingly, duplicate entries of four nodes being allocated to either of subtree slot 1, 2 or 3 are not represented in Table 1. Similarly, allocation 2 of this particular example indicates the allocation of two nodes to subtree slot 0 and two nodes to subtree slot 1. This allocation merely represents the allocation of two nodes to a first subtree slot and two nodes to a second, different, subtree slot. Accordingly, duplicate entries of two nodes being allocated to each of slots 2 and 3, among others, are not represented in Table 1.

According to one embodiment, a merger operation discussed above (for combining trees at their root nodes to provide a graphical and numerical expression of the resulting merged tree) may be expanded to create a set merger operation to include a merger among trees in different sets of trees. Here, a member tree of a first set merges with a member tree of a second set to provide a third, merged set containing the merged trees as elements, for all members of both sets. Regarding the representation of the trees as natural numerals, the set merger operation to merge sets X and Y may be expressed as $$
\begin{aligned}
X \times Y = \{x_1, x_2, x_3, \ldots, x_n\} \times \{y_1, y_2, y_3, \ldots, y_m\} &= \quad (3)\\
= \{x_1 * y_1, x_1 * y_2, x_1 * y_3, \ldots, x_1 * y_m\} &\cup \\
\{x_2 * y_1, x_2 * y_2, x_2 * y_3, \ldots, x_1 * y_m\} &\cup \\
\{x_3 * y_2, x_3 * y_2, x_3 * y_3, \ldots, x_3 * y_m\} &\cup \ldots \cup \\
\{x_n * y_1, x_n * y_2, x_n * y_3, \ldots, x_n * y_m\}
\end{aligned}
$$

where:

$x_1, x_2, x_3, \ldots x_n$ are the natural numerals representing trees in set X; and $y_1, y_2, y_3, \ldots y_m$ are the natural numerals representing trees in set Y;

Using the set merger operation illustrated at relation (3), for this particular embodiment, the merger of sets {FTs: N} and {FTs: M}, representing all trees which may be enumerated from N and M nodes, respectively, provides a set of trees enumerating all trees formed by the merger of any tree in {FTs: N} with any tree in {FTs: M}.

Figure 17:
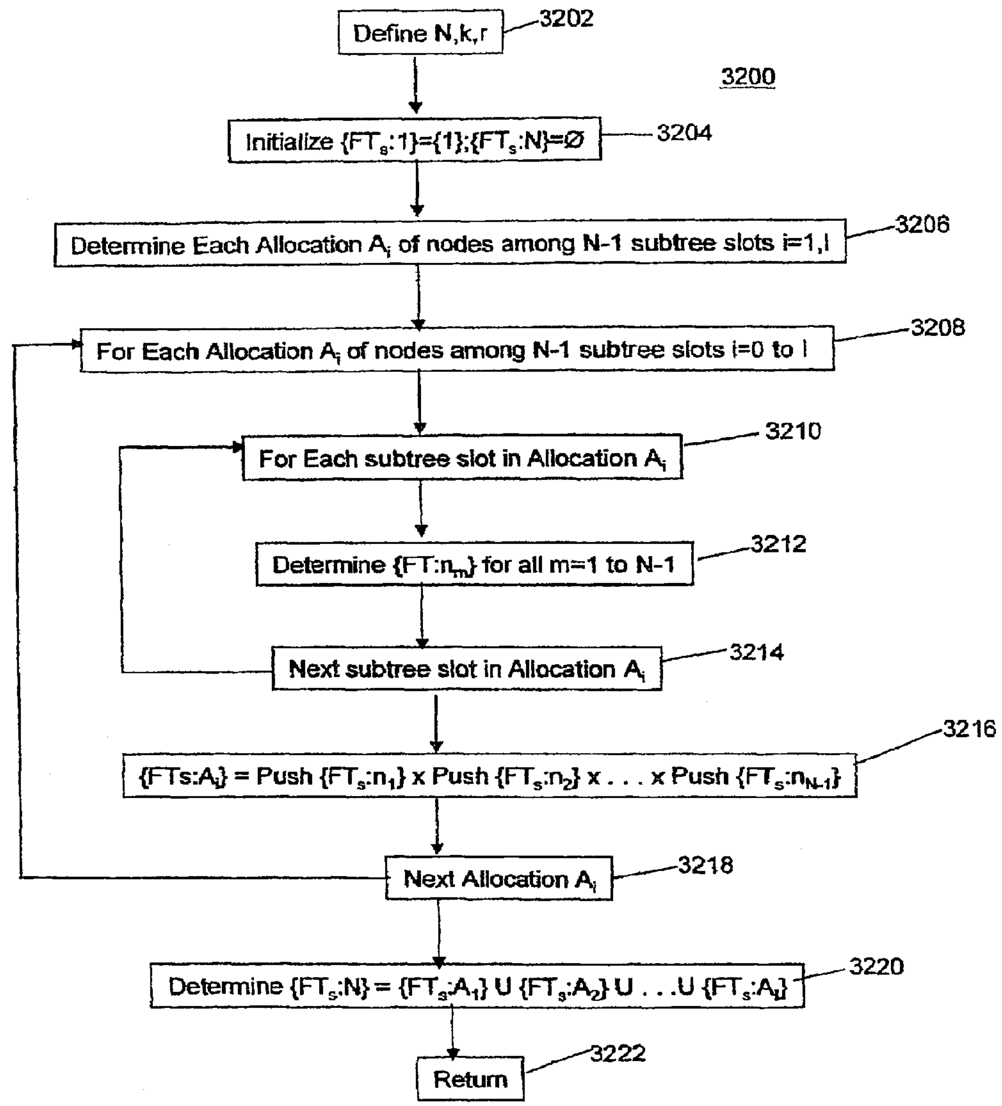
FIG. 17 is a flow diagram illustrating a process to enumerate all trees which are configurable from a finite number of nodes according to an embodiment.
Figure 23:
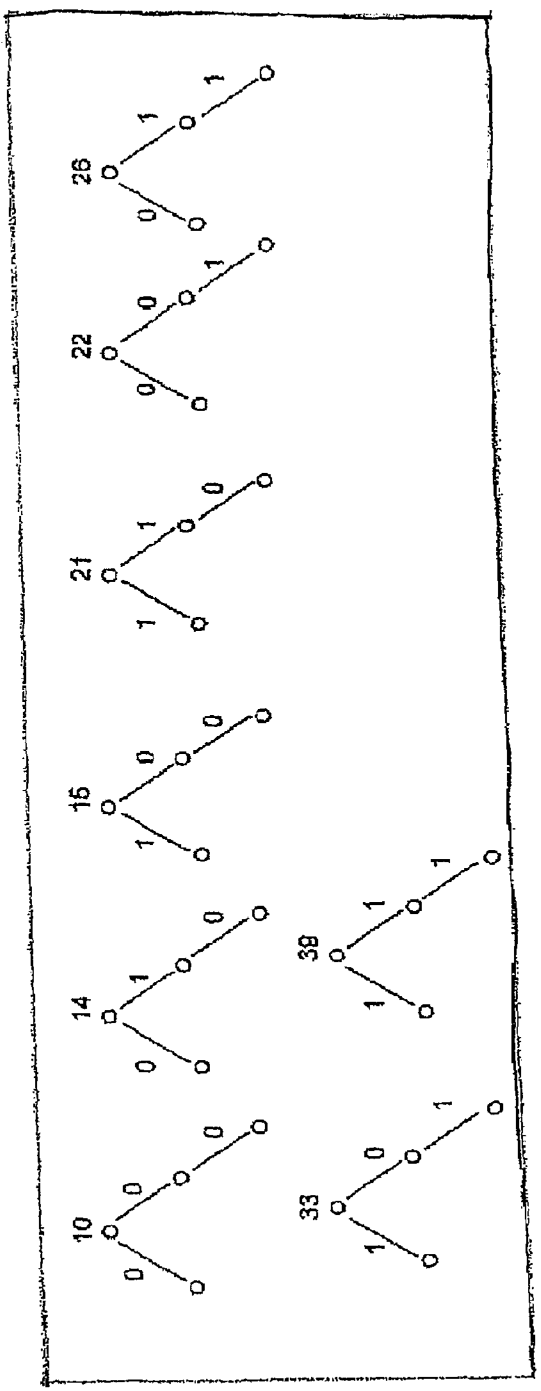
FIGS. 23 through 25 are schematic diagrams illustrating BELTs that may be configured from four nodes.
Figure 24:
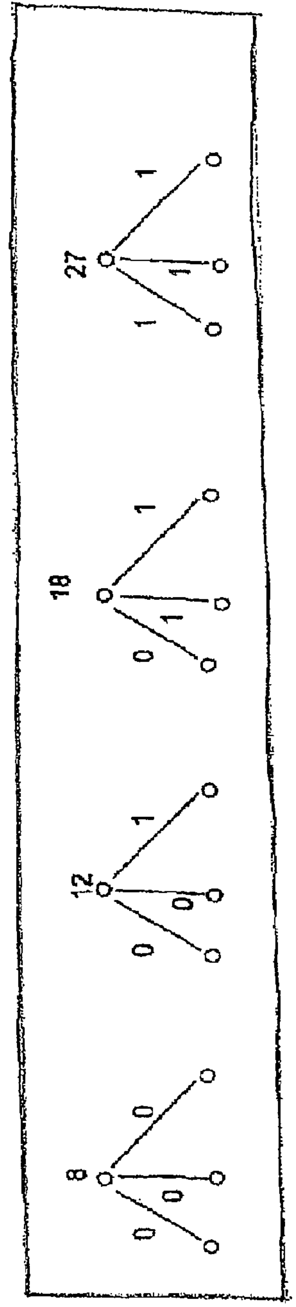
Figure 25:
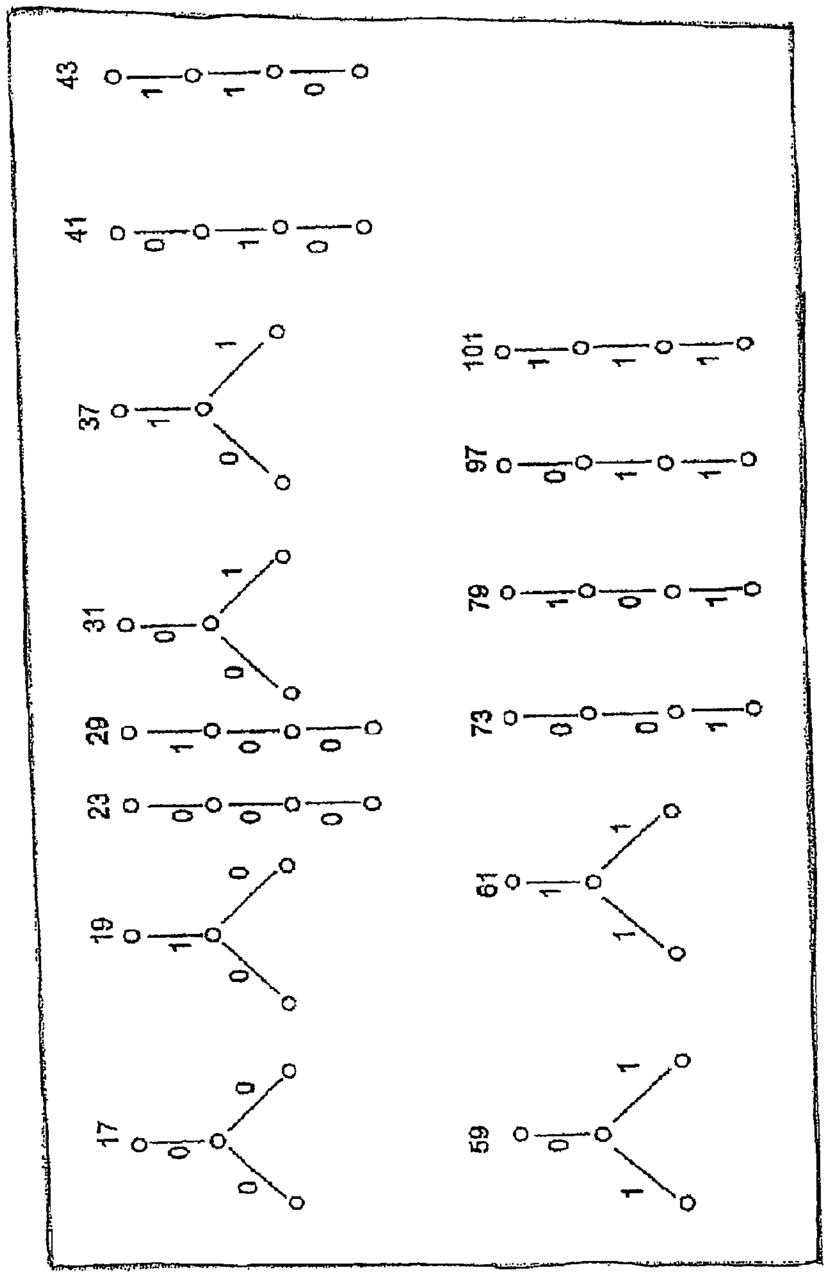

FIG. 17 is a flow diagram illustrating an embodiment of a process 3200 for enumerating trees which may possibly be configured from an N number of nodes {FTs: N}(under a given set of conditions) and determining a corresponding unique natural numerals for representing the particular enumerated trees. The process 3200 may be implemented as a computer program or subroutine expressed as machine-readable instructions which are executable by a processor. However, the claimed subject matter is not limited in scope in this respect.

Block 3202 defines parameters indicating the size and type of trees that are to be enumerated. N determines the number of nodes in the enumerated trees. The parameters r and k determine the defined value of the enumerated tree system and total number of values possible for a label as indicated for the push operation of relation (1). Block 3204 initializes full tree set {FTs: 1}={I} to represent a natural numeral for a single root node. As discussed below, in this particular example, the enumerated trees are generated from applying a push operation of relation (1) to the single root node. It should be understood, however, that the single root node may be associated with a different natural numeral and the claimed subject matter is not limited in this respect. Block 3204 also initializes full tree set {FTs: N}=Ø to indicate a set that initially contains no elements to which elements are to be added through the subsequent execution of blocks 3206 through 3220.

Block 3206 determines an allocation $A_i$ of nodes among up to N−1 subtree slots as illustrated in the example of Table 1 above. In the example of Table 1, allocation $A_i$ for i=0 to 4 represents an allocation of four nodes among up to four subtrees. For allocations $A_i$, a loop defined by blocks 3208 through 3218 determines a set containing trees that may be enumerated for the allocation $A_i$ (denoted as "{FTs: $A_i$}") and an associated natural numeral for the particular enumerated tree in {FTs: $A_i$}. A subtree slot m (where m=0 to N−1) in $A_i$ includes a number of nodes $n_m$ (from 0 to N−1). For a subtree slot in $A_i$, a loop defined by blocks 3210 through 3214 enumerates the set of all fully configured trees that may be configured from $n_m$ nodes {FTs: $n_m$}. Block 3212 may determine {FTs: $n_m$} by recursively executing the described process 3200 using the argument of $n_m$ as N in block 3202 of the recursively executed process 3200 (while maintaining the parameters k and r in block 3202 of the recursively executed process 3200).

Block 3216 determines the set {FTs: $A_i$}based, at least in part, upon the sets {FTs: $n_m$}, m=0 to N−1, determined in the loop of blocks 3210 through 3214. For a set {FTs: $n_m$}, block 3216 determines the push of this set according to the push operation of relation (2). As discussed above with reference to FIG. 9, a result of the push operation of relation (1) may depend on particular information associated with edge or node labels coupling the pushed subtree to a root node. In the case of a BELT, for example, the pushed subtree may be coupled to the root node by an edge labeled one or zero. Thus, in this particular example, to enumerate all trees resulting from a pushed binary edge labeled subtree, the push operation of relation (1) may be applied with j=0 (e.g., a zero-push) to enumerate a first resulting tree and with j=1 (e.g., a one-push) to enumerate a second resulting tree. Similarly, in the application of the push operation of relation (2) to a set of tree elements, the resulting enumerated pushed tree element may depend on particular information associated with edge or node labels coupling the pushed tree element to a root node. Thus, in this particular example, to enumerate all trees resulting from the application of push operation of relation (2) to a set of tree elements, block 3216 provides a union of j-push{FTs: $n_m$}sets for all possible values of j (e.g., for all j=0 to k). In the case of enumerating all BELTs from N nodes, for example, the operation "Push{FTs: $n_m$}" as shown in block 3216 refers to the union of zero-push{FTs: $n_m$} and one-push{FTs: $n_m$}. For the enumeration of trees with edge labels having more than two possible values, however, the operation "Push{FTs: $n_m$}" may refer to the union of more than two such pushed sets (i.e., a union of pushed sets for each possible value for j). Block 3216 then merges the pushed sets {FTs: $n_m$} using the set merger operation as shown in relation (3). Block 3220 then determines {FTs: N} as an unordered combination of the trees enumerated for all allocations $A_i$ of N−1 nodes determined at block 3216. In this particular example, {FTs: N} is determined as the union of the sets {FTs: $A_i$} determined at blocks 3208 through 3218.

An example of enumerating a tree from a finite number of nodes and determining a natural numeral for these trees in connection with process 3200 is illustrated with reference to FIGS. 18 through 25 in which the number of nodes for each enumerated tree is N=4. In this particular example, the enumerated trees will be BELTs, defining, for this particular embodiment, the initial conditions to include k=2 and r=1 in the push operation of relation (2). However, this is merely an example of a tree that may have N nodes and the presently illustrated embodiment may be applied to the enumeration of differently labeled trees. For example, the presently illustrated example may be extended to non-BELT trees by selecting different values for "k" and "r" for the push operation of relation (2). However, a push operation other than that of relation (2) may be employed depending on the particular embodiment.

In an initial operation, {FTs: 4}=Ø. In a base operation, {FTs: 1}={1}. A distribution list for {FTs: 4}provides possible allocations of N (here, four) nodes among up to N−1 (here, three) subtree slots is shown in Table 2 below (as determined at block 3206):

TABLE 2

Allocation of N − 1 (Three) Nodes Among up to N − 1 Subtree Slots

| Allocation Number | Subtree Slots 0 | 1 | 2 |
|---|---|---|---|
| 0 | 3 | 0 | 0 |
| 1 | 2 | 1 | 0 |
| 2 | 1 | 1 | 1 |

In the allocations of three nodes among subtree slots of Table 2, an allocation may allocate to a subtree slot one, two or all three nodes. Thus, for any of these subtree slots, the process 3200 may enumerate sets of fully configured subtrees for these allocations of one, two or all three nodes to a subtree slot as {FTs: 1}(determined as {1} in the base operation), {FTs: 2} and {FTs: 3}, respectively. Block 3212 may recursively determine values for these sets. For {FTs: 3}, a distribution list setting forth possible allocations of three nodes among two subtree slots is shown in Table 3 below:

TABLE 3

Allocation of Two Nodes Among Two Subtree Slots

| Allocation Number | Subtree Slots 0 | 1 |
|---|---|---|
| 0 | 2 | 0 |
| 1 | 1 | 1 |

For {FTs: 2}, there is one unique allocation of a single node depending from a root node in a single subtree slot and provides a subtree as shown in FIG. 18. The push operation is then applied to determine the elements of {FTs: 2}Since the possible subtree structures are BELTs (here, with k=1), {FTs: 2} is expressed as the union of a zero-push and one-push values as follows:

$$\{\langle j=0,k=1\rangle-\text{push}[\{1\}]\}\cup\{\langle j=1,k=1\rangle-\text{push}[\{1\}]\}=$$
$$\{\langle j=0,k=1\rangle-\text{push}(1)\}\cup\{\langle j=1,k=1\rangle-\text{push}(1)\}=$$
$$\{P(1)\cup P(2)\}=\{2,3\}$$

These enumerated trees in {FTs: 2} are shown in FIG. 19. Since there is only one allocation of nodes to a single subtree slot for {FTs: 2}, there is no merger operation for determining the elements of {FTs: 2}.

To determine the elements of {FTs: 3}, a first component of elements is determined from the allocation of two nodes to a single subtree slot (as shown in allocation 0 of Table 3) and a second component of elements is determined from the allocation of a single node to two subtree slots (as shown in allocation 0 of Table 3). Regarding the first component of {FTs: 3}, these two nodes allocated to a single subtree slot may be formed in four different binary edge labeled strings as illustrated in FIG. 20. These binary edge labeled strings are, in effect, either a zero-push or one-push of the trees enumerated in {FTs: 2}={2, 3}. As such, the set of values for these trees may be enumerated as follows:

$$\{\langle j=0,k=1\rangle-\text{push}[\{2,3\}]\}\cup$$
$$\{\langle j=1,k=1\rangle-\text{push}[\{2,3\}]\}\{\langle j=0,k=1\rangle-\text{push}(2)\}\cup$$
$$\{\langle j=1,k=1\rangle-\text{push}(2)\}\cup\{\langle j=0,k=1\rangle-\text{push}(3)\}\cup$$
$$\{\langle j=1,k=1\rangle-\text{push}(3)\}=\{5,7,11,13\}$$

The second, remaining component of elements of {FTs: 3}, may be represented in three different BELTs as illustrated in FIG. 21. As such, the set of values for these trees may be enumerated by performing a set merger operation of {FT: 2}(as shown in FIG. 19) with itself as follows (block 3216):

$$\{FT{:}\ 2\}\times\{FT{:}\ 2\}=\{2,3\}\times\{2,3\}=\{2*2,2*3,3*3\}=\{4,6,9\}$$

Accordingly, the union of the elements from first and second components of {FT: 3}(as derived above from the allocations 0 and 1 in Table 3) provides {FTs: 3}={4, 5, 6, 7, 9, 11, 13}. As shown in FIG. 22, each of these elements correspond with a unique subtree in {FTs: 3} and is associated with a corresponding natural numeral.

To determine the elements of {FTs: 4}, a first component of the elements is determined from the allocation of three nodes a single subtree slot (as shown in allocation 0 of Table 2), a second component of the elements is determined from the allocation of two nodes to a first subtree slot and one node to a second subtree slot (as shown in allocation 1 of Table 2) and a third component of the elements is determined from the allocation of a single node to three subtree slots (as shown in allocation 2 of Table 2). {FTs: 4} comprises the union of these three components.

The elements of the first component of {FTs: 4}, derived from the allocation of three nodes allocated to a single subtree slot, comprises, in effect, a union of a zero-push and one-push of {FTs: 3}(={4, 5, 6, 7, 9, 11, 13} as derived above and graphically illustrated in FIG. 22). These elements of the first component of {FTs: 4} are depicted graphically in FIG. 25 and are enumerated as follows:

$$\begin{aligned}
&\{\langle j=0,k=1\rangle-\text{push}[\{FTs{:}3\}]\}\cup\{\langle j=1,k=1\rangle-\text{push}[\{FTs{:}3\}]\}=\\
&\{\langle j=0,k=1\rangle-\text{push}[\{4,5,6,7,9,11,13\}]\}\cup\\
&\{\langle j=1,k=1\rangle-\text{push}[\{4,5,6,7,9,11,13\}]\}=\\
&\{\langle j=0,k=1\rangle-\text{push}(4)\}\cup\{\langle j=1,k=1\rangle-\text{push}(4)\}\cup\\
&\{\langle j=0,k=1\rangle-\text{push}(5)\}\cup\{\langle j=1,k=1\rangle-\text{push}(5)\}\cup\\
&\{\langle j=0,k=1\rangle-\text{push}(6)\}\cup\{\langle j=1,k=1\rangle-\text{push}(6)\}\cup\\
&\{\langle j=0,k=1\rangle-\text{push}(7)\}\cup\{\langle j=1,k=1\rangle-\text{push}(7)\}\cup\\
&\{\langle j=0,k=1\rangle-\text{push}(9)\}\cup\{\langle j=1,k=1\rangle-\text{push}(9)\}\cup\\
&\{\langle j=0,k=1\rangle-\text{push}(11)\}\cup\{\langle j=1,k=1\rangle-\text{push}(11)\}\cup\\
&\{\langle j=0,k=1\rangle-\text{push}(13)\}\cup\{\langle j=1,k=1\rangle-\text{push}(13)\}=\\
&\{17,19,23,29,31,37,41,43,59,61,73,79,97,101\}.
\end{aligned}$$

The elements of the second component of {FTs: 4} are derived from the allocation of two nodes to a first subtree slot and a single node to a second subtree slot. These elements comprise, in effect, a set merger of {zero-push[{FTs: 2}] U one-push[{FTs: 2}]} (graphically illustrated in FIG. 20) and {zero-push[{FTs: 1}] U one-push[{FTs: 1}]} (graphically illustrated in FIG. 19). The elements from the resulting set merger operation are graphically illustrated in FIG. 23 and the corresponding numbers representing the resulting elements are determined as follows (block 3216):

$$\begin{aligned}
&\{\langle j=0,k=1\rangle-\text{push}[\{FTs{:}2\}]\cup\langle j=1,k=1\rangle-\text{push}[\{FTs{:}2\}]\}\times\\
&\{\langle j=0,k=1\rangle-\text{push}[\{FTs{:}1\}]\cup\langle j=1,k=1\rangle-\text{push}[\{FTs{:}1\}]\}=\\
&\{\langle j=0,k=1\rangle-\text{push}[\{2,3\}]\cup\langle j=1,k=1\rangle-\text{push}[\{2,3\}]\}\times\\
&\{\langle j=0,k=1\rangle-\text{push}[\{1\}]\cup\langle j=1,k=1\rangle-\text{push}[\{1\}]\}=\\
&\{5,7,11,13\}\times\{2,3\}=\{10,14,15,21,22,26,33,39\}
\end{aligned}$$

The elements of the third component of the elements of {FTs: 4} are derived from the allocation of a single node to each of three subtree slots. These elements are, in effect, a set merger operation of {zero-push[{FTs: 1}]U one-push[{FTs: 1}]} (as graphically illustrated in FIG. 19) with itself twice. The elements from the resulting set merger operation are graphically illustrated in FIG. 24 and the corresponding numerals representing the elements are determined as follows (block 3216):

$$\begin{aligned}
&\{\langle j=0,k=1\rangle-\text{push}[\{FTs{:}1\}]\cup\langle j=1,k=1\rangle-\text{push}[\{FTs{:}1\}]\}\times\\
&\{\langle j=0,k=1\rangle-\text{push}[\{FTs{:}1\}]\cup\langle j=1,k=1\rangle-\text{push}[\{FTs{:}1\}]\}\times\\
&\{\langle j=0,k=1\rangle-\text{push}[\{FTs{:}1\}]\cup\langle j=1,k=1\rangle-\text{push}[\{FTs{:}1\}]\}=\\
&\{2,3\}\times[\{2,3\}\times\{2,3\}]=\{2,3\}\times\{4,6,9\}=\{8,12,18,27\}
\end{aligned}$$

The union of the first, second and third components of the elements of {FTs: 4}, separately derived from allocations 0, 1 and 3 of three nodes among subtree slots (block 3220), is provided as follows:

$$\begin{aligned}
&\{FTs{:}4\}=\{17,19,23,29,31,37,41,43,59,61,73,79,97,101\}\cup\\
&\{10,14,15,21,22,26,33,39\}\cup\{8,12,18,27\}\\
&=\left\{\begin{matrix}8,10,12,14,15,17,18,19,21,22,23,26,27,\\29,31,33,37,39,41,43,59,61,73,79,97,101\end{matrix}\right\}.
\end{aligned}$$

While the above illustrated example is a specific case of enumerating BELTs from four nodes, it should be understood that the process 3200 is general enough to enumerate trees for any finite number of nodes N. Also, while the illustrated example is specifically directed to enumerating BELTs, the claimed subject matter is not limited to this specific example.

According to an embodiment, the technique described above may have many applications in the management and/or manipulation of hierarchical data. The ability to enumerate possible fully configured trees from a finite number of nodes may be applied to any one of several database management applications. In one example, with a priori knowledge of a size and type of tree representing hierarchical data in a cache memory, for example, a cache process may anticipate the extent of requests for retrieval of hierarchical data represented by a tree.

In another application, pattern matching may be used as a form of answering queries. Using the above described technique for enumerating possible trees from a finite number of nodes, possible tree patterns may be efficiently generated in advance of receipt of a query to be matched with one of the generated tree patterns. Here, for example, a set of enumerated trees may be generated prior to a query to anticipate all potential hierarchical relationships for a given set of data. The query may then be mapped and matched with all possible tree structures with a given number of nodes. By anticipating all potential hierarchical relationships in advance of the query, the query may be answered more quickly. Of course, these are merely examples and the claimed subject matter is not limited to these examples.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method comprising:

enumerating one or more possible trees configurable from a finite number (N) of nodes;

determining for the enumerated trees natural numerals associated with particular ones of the enumerated trees, the natural numerals being based, at least in part, on a predetermined association between trees and natural numerals;

wherein said enumerating comprises enumeration of each of the one or more possible trees, and wherein said determining natural numerals for the enumerated trees comprises determining a natural numeral for each one of the enumerated trees;

determining one or more allocations of the finite number of nodes among subtree slots, an allocation defining a portion of the finite number of nodes to a subtree slot in the allocation; and for the subtree slot in the allocation, enumerating a set containing one or more possible subtrees configurable from the portion of the finite number of nodes allocated to the subtree slot.

2. The method of claim 1, wherein the enumerated trees comprise binary edge labeled trees.

3. The method of claim 1, the method further comprising:

identifying N−1 arrangements of subtree slots coupled to a root node; and determining possible allocations of N−1 nodes among subtree slots in arrangements of subtree slots;

for a subtree slot in a possible allocation of the N−1 nodes, determining one or more natural numerals for possible configurations of a subtree from nodes allocated to the subtree slot.

4. The method of claim 1, wherein the natural numeral comprises a product of one or more component natural numerals, the one or more component natural numerals representing a subtree among subtrees which are merged at a root node to form the associated enumerated tree.

5. The method of claim 1, the method further comprising:

identifying N−1 arrangements of subtree slots coupled to a root node; for an arrangement of subtree slots:

determining one or more allocations of N−1 nodes among the subtree slots in the arrangement, a subtree slot being allocated a portion of said N−1 nodes; and for the subtree slots, enumerating one or more possible subtrees configurable from the portion of said N−1 nodes allocated to the subtree slot.

6. The method of claim 1, wherein said enumerating possible configurable trees comprises enumerating the possible trees configurable from exactly N nodes.

7. An apparatus comprising:

means for enumerating one or more possible trees configurable from a finite number (N) of nodes;

means for determining for the enumerated trees natural numerals associated with particular ones of the enumerated trees, the natural numerals being based, at least in part, on a predetermined association between trees and natural numerals;

wherein said means for enumerating comprises means for enumerating each of the one or more possible trees, and wherein said means for determining natural numerals for the enumerated trees comprises means for determining a natural numeral for each one of the enumerated trees;

means for determining one or more allocations of the finite number of nodes among subtree slots, an allocation defining a portion of the finite number of nodes to a subtree slot in the allocation; and for the subtree slot in the allocation, means for enumerating a set containing one or more possible subtrees configurable from the portion of the finite number of nodes allocated to the subtree slot.

8. The apparatus of claim 7, wherein the enumerated trees comprise binary edge labeled trees.

9. The apparatus of claim 7, the apparatus further comprising:

means for identifying N−1 arrangements of subtree slots coupled to a root node;

means for determining possible allocations of N−1 nodes among subtree slots in arrangements of subtree slots; and for a subtree slot in a possible allocation of the N−1 nodes, means for determining one or more natural numerals for possible configurations of a subtree from nodes allocated to the subtree slot.

10. The apparatus of claim 7, wherein the natural numeral comprises a product of one or more component natural numerals, the one or more component natural numerals representing a subtree among subtrees which are merged at a root node to form the associated enumerated tree.

11. The apparatus of claim 7, the apparatus further comprising:

means for identifying N−1 arrangements of subtree slots coupled to a root node;

means for determining one or more allocations of N−1 nodes among the subtree slots in an identified arrangement of subtree slots, a subtree slot being allocated a portion of said N−1 nodes; and means for enumerating one or more possible subtrees configurable from the portion of said N−1 nodes allocated to the subtree slot.

12. The apparatus of claim 7, wherein said means for enumerating possible configurable trees comprises means for enumerating the possible trees configurable from exactly N nodes.

13. An apparatus comprising a computing platform, the computing platform being adapted to:

enumerate one or more possible trees configurable from a finite number (N) of nodes;

determine for the enumerated trees natural numerals associated with particular ones of the enumerated trees, the natural numerals being based, at least in part on a predetermined association between trees and natural numerals;

wherein said enumerating comprises enumeration of each of the one or more possible trees, and wherein said determining natural numerals for the enumerated trees comprises determining a natural numeral for each one of the enumerated trees;

determine one or more allocations of the finite number of nodes among subtree slots, an allocation defining a portion of the finite number of nodes to a subtree slot in the allocation; and for the subtree slot in the allocation, enumerate a set containing one or more possible subtrees configurable from the portion of the finite number of nodes allocated to the subtree slot.

14. The apparatus of claim 13, wherein the enumerated trees comprise binary edge labeled trees.

15. The apparatus of claim 13, wherein the computing platform is further adapted to:

identify N−1 arrangements of subtree slots coupled to a root node;

determine possible allocations of N−1 nodes among subtree slots in arrangements of subtree slots; and for a subtree slot in a possible allocation of the N−1 nodes, determine one or more natural numerals for possible configurations of a subtree from nodes allocated to the subtree slot.

16. The apparatus of claim 13, wherein the natural numeral comprises a product of one or more component natural numerals, the one or more component natural numerals representing a subtree among subtrees which are merged at a root node to form the associated enumerated tree.

17. The apparatus of claim 13, wherein the computing platform is further adapted to:

identify N−1 arrangements of subtree slots coupled to a root node;

determine one or more allocations of N−1 nodes among the subtree slots in an identified arrangement of subtree slots, a subtree slot being allocated a portion of said N−1 nodes; and enumerate one or more possible subtrees configurable from the portion of said N−1 nodes allocated to the subtree slot.

18. The apparatus of claim 13, wherein the computing platform is further adapted to enumerating the possible trees configurable from exactly N nodes.

19. An article comprising:

a storage medium comprising machine readable instructions stored thereon to:

enumerate one or more possible trees configurable from a finite number (N) of nodes;

determine for the enumerated trees natural numerals associated with particular ones of the enumerated trees, the natural numerals being based, at least in part on a predetermined association between trees and natural numerals;

wherein said enumerating comprises enumeration of each of the one or more possible trees, and wherein said determining natural numerals for the enumerated trees comprises determining a natural numeral for each one of the enumerated trees;

determine one or more allocations of the finite number of nodes among subtree slots, an allocation defining a portion of the finite number of nodes to a subtree slot in the allocation; and for a subtree slot in an allocation, enumerate a set containing one or more possible subtrees configurable from the portion of the finite number of nodes allocated to the subtree slot.

20. The article of claim 19, wherein the enumerated trees comprise binary edge labeled trees.

21. The article of claim 19, wherein the storage medium further comprises machine-readable instructions stored thereon to:

identify N−1 arrangements of subtree slots coupled to a root node;

determine possible allocations of N−1 nodes among subtree slots in arrangements of subtree slots; and for a subtree slot in a possible allocation of the N−1 nodes, determine one or more natural numerals for possible configurations of a subtree from nodes allocated to the subtree slot.

22. The article of claim 19, wherein the natural numeral comprises a product of one or more component natural numerals, the one or more component natural numerals representing a subtree among subtrees which are merged at a root node to form the associated enumerated tree.

23. The article of claim 19, wherein the storage medium further comprises machine-readable instructions stored thereon to:

identify N−1 arrangements of subtree slots coupled to a root node;

determine one or more allocations of N−1 nodes among the subtree slots in an identified arrangement of subtree slots, a subtree slot being allocated a portion of said N−1 nodes; and enumerate one or more possible subtrees configurable from the portion of said N−1 nodes allocated to the subtree slot.

24. The article of claim 19, wherein the storage medium further comprises machine-readable instructions stored thereon to enumerating the possible trees configurable from exactly N nodes.

* * * * *